(12) United States Patent
Ueda et al.

(10) Patent No.: US 7,503,051 B1
(45) Date of Patent: Mar. 10, 2009

(54) BROADCAST DATA RECEIVING DEVICE AND METHOD FOR RECEIVING A PLURALITY OF MULTIMEDIA DATA

(75) Inventors: Eiji Ueda, Toyota (JP); Shinji Kawano, Hiroshima (JP); Futoshi Nakabe, Hiroshima (JP)

(73) Assignee: Panasonic Corporation, Osaka (JP)

( * ) Notice: Subject to any disclaimer, the term of this patent is extended or adjusted under 35 U.S.C. 154(b) by 18 days.

(21) Appl. No.: 09/590,075

(22) Filed: Jun. 9, 2000

(30) Foreign Application Priority Data

Jun. 11, 1999 (JP) ............................... 11-165939

(51) Int. Cl.
  *G06F 15/16* (2006.01)
  *G06F 15/173* (2006.01)
  *G06F 15/177* (2006.01)
(52) U.S. Cl. ...................... 719/313; 709/223; 712/201; 715/717
(58) Field of Classification Search .................. 709/313, 709/322, 311, 318, 200–203, 217–228; 395/604, 395/600, 609, 606; 364/283.3; 719/310–315, 719/322, 318; 707/2; 715/717; 712/201
See application file for complete search history.

(56) References Cited

U.S. PATENT DOCUMENTS

| 5,857,181 | A | * | 1/1999 | Augenbraun et al. ............ 707/2 |
| 5,960,081 | A | * | 9/1999 | Vynne et al. .................. 713/176 |
| 6,204,842 | B1 | * | 3/2001 | Fujii ............................ 715/717 |
| 6,205,485 | B1 | * | 3/2001 | Kikinis ....................... 709/231 |

(Continued)

FOREIGN PATENT DOCUMENTS

WO  99/13644  3/1999

(Continued)

OTHER PUBLICATIONS

Mohamed Abdel-Mottaleb et al., "MPEG-7: Applications and Supporting Technologies," VLBV, Proceedings of VLBV, International Workshop On Very Low Bitrate Video Coding, pp. 61-64, 1998, XP 000865753.

(Continued)

*Primary Examiner*—Haresh N Patel
(74) *Attorney, Agent, or Firm*—Wenderoth, Lind & Ponack, L.L.P.

(57) ABSTRACT

A data distribution system is provided which generates outputs attribute data about multimedia data in advance and broadcasts the output attribute data together with the multimedia data so that the receiving terminal can grasp the outlines of the entire multimedia data and improve the visibility. A data broadcasting device (1) generates output attribute data about multimedia data in a data analyzing portion (13). The output attribute data exists alone or is embedded in the multimedia data. The multimedia data and the output attribute data are encoded in a protocol encoder (14) and broadcast from a transmitter (15). A receiving terminal device (2) receives the broadcast data in a tuner (21) and obtains the multimedia data and output attribute data in a tuner (21). When a data display portion (26) displays the obtained multimedia data, the output attribute data is referred to and information related to the multimedia data is displayed together with the multimedia data. A data analyzing portion (24) analyzes the multimedia data and extracts the output attribute data embedded therein.

4 Claims, 14 Drawing Sheets

U.S. PATENT DOCUMENTS

| | | | |
|---|---|---|---|
| 6,240,555 B1 * | 5/2001 | Shoff et al. | 725/110 |
| 6,243,713 B1 * | 6/2001 | Nelson et al. | 707/104.1 |
| 6,360,234 B2 * | 3/2002 | Jain et al. | 715/500.1 |
| 6,374,404 B1 * | 4/2002 | Brotz et al. | 725/46 |
| 6,398,245 B1 * | 6/2002 | Gruse et al. | 280/228 |
| 6,400,996 B1 * | 6/2002 | Hoffberg et al. | 700/83 |
| 6,411,724 B1 * | 6/2002 | Vaithilingam et al. | 382/100 |
| 6,411,725 B1 * | 6/2002 | Rhoads | 382/100 |
| 6,430,177 B1 * | 8/2002 | Luzeski et al. | 370/356 |
| 6,433,835 B1 * | 8/2002 | Hartson et al. | 348/608 |
| 6,442,590 B1 * | 8/2002 | Inala et al. | 709/204 |
| 6,510,461 B1 * | 1/2003 | Nielsen | 709/224 |
| 6,519,693 B1 * | 2/2003 | Debey | 712/201 |
| 6,642,939 B1 * | 11/2003 | Vallone et al. | 345/721 |
| 2001/0039571 A1 * | 11/2001 | Atkinson | 709/217 |
| 2005/0149961 A1 * | 7/2005 | Yoon et al. | 720/718 |

FOREIGN PATENT DOCUMENTS

| | | |
|---|---|---|
| WO | 99/22502 | 5/1999 |
| WO | WO 99/22502 * | 5/1999 |

OTHER PUBLICATIONS

"ITU-T White Book," Recommendations on Digital Still Image Compression Encoding, the ITU Association of Japan, Inc., Jan. 1994, pp. 42-58.

ISO/IEC 10918-1:1 1993(E), Annex B, Compressed data formats, CCITT Rec. T.81 (1992 E), Sep. 1992, pp. 31-47.

* cited by examiner

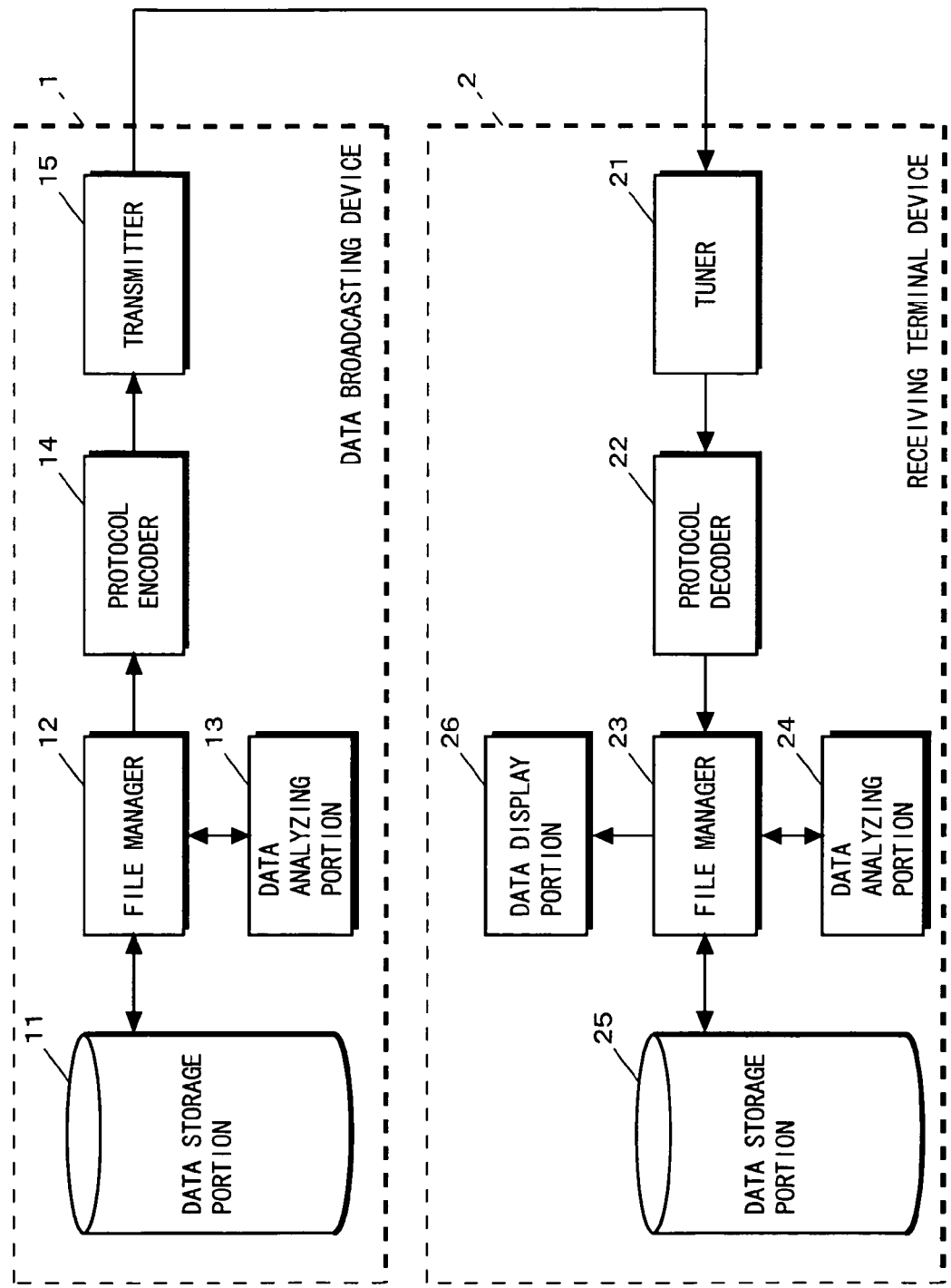

| DATA TYPE | DATA TYPE ID | SIGN |
|---|---|---|
| HTML | 0 | L |
| JPEG NATURAL PAINTING | 1 | P |
| JPEG LINE DRAWING | 2 | D |

FIG. 11

```
...
MENU[L, 12, 5, 2]
...
PHOTO[P, 0, 1, 5]
GRAPH[D, 0, 1, 3]  ← DATA HAS NOT ARRIVED
...
TOTAL MENU[L, 74, 15, 2]
...
```

(a)

```
...
MENU[L, 12, 5, 2]  ← EXTERNAL DATA.
...                   ACCESS ?
PHOTO[P, 0, 1, 5]       1 : YES
GRAPH[D, 0, 1, 3]       2 : NO
...
TOTAL MENU[L, 74, 15, 2]
...
```

(b)

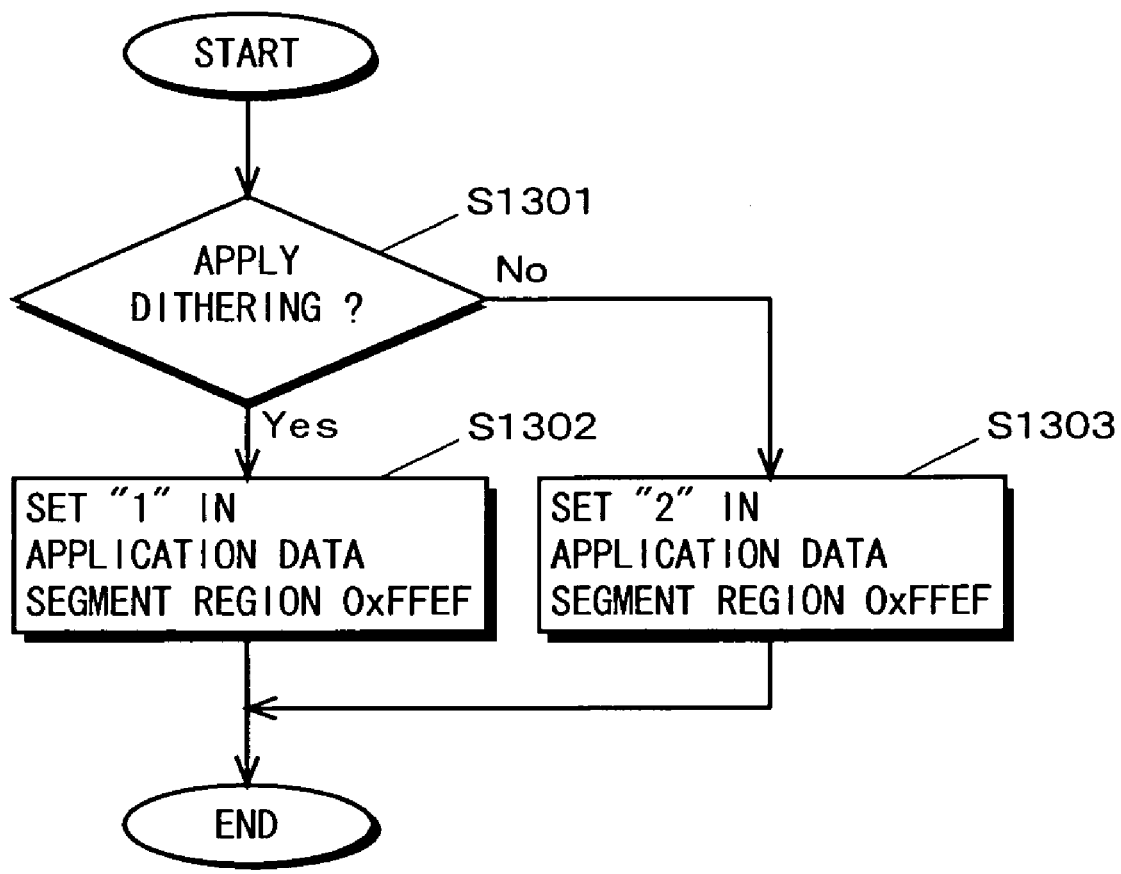
F I G. 1 3

BROADCAST DATA RECEIVING DEVICE AND METHOD FOR RECEIVING A PLURALITY OF MULTIMEDIA DATA

CROSS-REFERENCE TO RELATED APPLICATIONS

The present application claims foreign priority under 35 U.S.C. § 119 to Japanese Patent Application No. 1999-165939, filed on Jun. 11, 1999.

BACKGROUND OF THE INVENTION

1. Field of the Invention

The present invention relates to a data distribution system and devices used in the system, and more particularly to a system in which multimedia data is broadcast (transmitted) from a transmission device by broadcast or communication and the broadcast (transmitted) multimedia data is received at a receiving device and displayed on a screen, and to the devices used in this system.

2. Description of the Background Art

Various terminal devices which obtain and display distributed multimedia data have been conventionally developed. Among such devices, terminal devices used on the Internet obtain the multimedia data as follows. First, according to an instruction from a user, the terminal device directly accesses through the Internet a WWW (World Wide Web) server in which multimedia data are previously stored. The terminal device then retrieves necessary multimedia data from the WWW server.

In this way, the main current of the system for obtaining multimedia data has been the method of so-called "pull" type, where users freely retrieve target data typically through the Internet as stated above.

On the other hand, the demand for multimedia data distribution through broadcasting is currently growing, which belongs to "push" type where data is pushed out toward users. The data distribution through DAB (Digital Audio Broadcasting) which was developed in the EUREKA-147 project in Europe is an example of the push type. In such multimedia data distribution through broadcasting, a user can obtain necessary multimedia data by indicating to a receiving terminal a broadcast channel to receive the data. That is to say, necessary multimedia data is automatically received through the specified channel and displayed.

The user of the receiving terminal can thus easily refer to the multimedia data just like through conventional broadcast on TV or radio. In this way, the multimedia data distribution through broadcasting has the advantage of saving the need for executing the process of searching for and taking out necessary data.

However, the above-explained multimedia data distribution through broadcasting differs from the real time data distribution from WWW servers on the Internet (distribution where a data distribution response to a data reference request can be made in real time). A broadcasting station in the broadcast multimedia data distribution therefore cannot process reference requests from users in real time. It is hence difficult for the users to control the contents of the broadcast multimedia data in the broadcast multimedia data distribution.

That is to say, when users demand to refer to arbitrary multimedia data, it is difficult for the broadcasting station in the data broadcasting system to satisfy every reference request in real time. Accordingly the users must wait until multimedia data they want to refer to are broadcast according to a predetermined broadcast program to obtain the necessary multimedia data.

Now, if data can be stored in the receiving terminal, the user can locally refer to the multimedia data broadcast in the past (multimedia data stored in the receiving terminal). However, although it depends on the circuit scale of the terminal and the cost, the receiving terminal is usually capable of storing only a small part of the data stored in the data broadcast equipment in the broadcasting station. Thus, although the multimedia data can be locally referred to, the user is actually allowed just to fragmentarily and time-sequentially receive and refer to only part of the multimedia data existing in the data broadcasting equipment.

For example, when the multimedia data to be referred to is in the HTML (Hyper Text Markup Language) format having a link structure, the users cannot conveniently refer to the multimedia data until they receive other multimedia data linked to the multimedia data (referred to as linked data hereinafter).

Moreover, when the linked data is absent in the data broadcasting equipment, e.g., when the linked data resides in an external WWW server, the user cannot even known the outlines of the data, not to mention referring to the linked data.

As stated above, in the multimedia data distribution through broadcasting, users cannot know what multimedia data will be broadcast and have to wait passively. The multimedia data distribution through broadcasting thus has the problem that the users cannot grasp the entire structure of the broadcast multimedia data and therefore have difficulty in judging which multimedia data are necessary. That it to say, the users cannot instantaneously decide whether data linked to the multimedia data currently referred to is necessary, and therefore they cannot decide whether to store the multimedia data currently referred to. This fact not only makes it difficult for the users to grasp the information about the entire data but also requires the terminal devices receiving the data broadcast to be equipped with storage devices with increased capacity.

The above problem that the contents of broadcast multimedia data cannot be known until it is received leads to other problems related to the display attributes of the multimedia data. Such problems include one related to dithering used when displaying JPEG (Joint Photographic Experts Group) images, for example. This problem arises not only in data distribution by broadcast but also in data distribution by communications.

Most mobile receiving terminals, such as portable telephones and mobile terminals, are not provided with sufficient display capabilities because of the cost restriction, etc. For example, receiving terminals capable of displaying only up to 256 colors at one time cannot clearly display some JPEG data images such as photographs with gentle gradation (referred to as JPEG natural painting data hereinafter); the gradation may be displayed like stripes and then the picture will look very clumsy. On the other hand, such receiving terminals can well display JPEG data of line drawings like graphs (referred to as JPEG line drawing data hereinafter) with enhanced contrast.

Techniques for displaying JPEG data as smooth images include dithering. The dithering processing enables JPEG natural painting data to be displayed as an image close in appearance to the original picture. However, when dithering is applied to JPEG line drawing data, the whole becomes unclear (edges become especially unclear) and may be displayed as a deteriorated image with illegible details.

Accordingly, for JPEG data, it is desirable to decide whether or not to apply dithering according to the data type (whether a natural painting or line drawing) before displaying the image.

However, in the above-described multimedia data distribution through broadcasting, the receiving terminal displays the broadcast multimedia data in a mode previously defined in the receiving terminal (with or without dithering). Accordingly the multimedia data may be displayed in an undesirable mode.

SUMMARY OF THE INVENTION

Therefore an object of the present invention is to provide a data broadcast system, a data communication system, and devices used in the systems, wherein link information, image display information, etc., about multimedia data are previously generated and broadcast (or transmitted) together with the multimedia data and a receiving terminal manages the state of reception about the multimedia data so that the outlines of the entire multimedia data can be grasped and the visibility is improved in the receiving terminal.

To achieve the object above, the present invention has the following features:

A first aspect is directed to a data broadcast system comprising a data broadcasting device provided in a broadcasting station which broadcasts multimedia data and a receiving terminal device receiving the multimedia data broadcast from the data broadcasting device. A data broadcasting device in accordance with the first aspect of the present invention may comprise: a data analyzing portion for analyzing the contents of the multimedia data and generating output attribute data corresponding to the multimedia data, and a data transmitting portion for broadcasting the multimedia data together with the output attribute data. A receiving terminal device in accordance with the first aspect of the present invention may comprise: a receiving portion for receiving the multimedia data and the output attribute data which are broadcast, a data managing portion for managing and storing the multimedia data and the output attribute data which are received, and a data output portion for outputting the multimedia data together with its attribute information by referring to the output attribute data.

As stated above, in accordance with the first aspect, the data broadcasting device broadcasts multimedia data together with its output attribute data and the receiving terminal device outputs attribute information obtained from the output attribute data together with the multimedia data. Accordingly, for example, a user can know the information about data linked to the broadcast multimedia data without receiving or analyzing those data.

According to a second aspect, in the data broadcast system of the first aspect, the data broadcasting device further comprises a portion for embedding the output attribute data generated by the data analyzing portion in the multimedia data, and the data transmitting portion broadcasts the multimedia data in which the output attribute data is embedded.

As stated above, in accordance with the second aspect, the data broadcasting device embeds generated output attribute data in the multimedia data and broadcasts the same. Accordingly the receiving terminal device does not have to separately manage the multimedia data and the output attribute data; it can collectively manage the multimedia data. This allows a reduction in capacity of the storage device of the receiving terminal device. Further, the receiving terminal device can obtain the output attribute data by referring only to the multimedia data to be displayed. Moreover, the receiving terminal device can send/receive the output attribute data by sending/receiving the multimedia data.

According to a third aspect, in the data broadcast system of the second aspect, the receiving terminal device further comprises a data extracting portion for extracting from the received multimedia data the output attribute data embedded therein and outputting the output attribute data to the data managing portion, and the data managing portion manages the output attribute data extracted by the data extracting portion separately from the corresponding multimedia data.

As stated above, in accordance with the third aspect, the receiving terminal device extracts the output attribute data embedded in the multimedia data and separately manages the output attribute data and the multimedia data. Accordingly the multimedia data broadcast together with the output attribute data embedded therein is stored in the original form of the multimedia data in the receiving terminal device. Therefore it is possible to secure for the user that the data stored in the receiving terminal device is not altered. Further, the receiving terminal device can send/receive the multimedia data in its original form intended by the data provider.

According to a fourth aspect, in the data broadcast system of the first aspect, the receiving terminal device further comprises a data analyzing portion for analyzing the contents of the received multimedia data and newly generating the output attribute data about the multimedia data.

As stated above, in accordance with the fourth aspect, the receiving terminal device itself analyzes received multimedia data and generates new output attribute data. Accordingly it can set (change) the output attribute data so as to optimize the data for itself.

According to a fifth aspect, in the data broadcast system of the first aspect, the data managing portion further manages a state of reception about data linked to the multimedia data, and the data output portion outputs a state of data linked to the multimedia data by referring to the state of reception as well as the output attribute data.

As stated above, in accordance with the fifth aspect, the receiving terminal device outputs the state of linked data in the screen on the basis of the state of reception about the multimedia data. This saves the user tracing linked locations which cannot be displayed, thus previously saving the user performing troublesome operation (the operation of returning when the linked data is absent).

According to a sixth aspect, in the data broadcast system of the first aspect, when the multimedia data is data in an HTML format, the output attribute data comprises information about data linked to the multimedia data, concerning at least one of its file name, the number of images contained therein, its data size, and the number of data pieces further linked thereto.

According to a seventh aspect, in the data broadcast system of the first aspect, when the multimedia data is data in a JPEG format, the output attribute data comprises information about at least one of data type of the multimedia data (a natural painting or a line drawing) and a recommended screen size suited to display of the multimedia data.

As stated above, the sixth and seventh aspects show typical output attribute data information in particular multimedia data forms.

When information about data linked to HTML form data is set as the output attribute data as shown in the sixth aspect, the user can judge the importance of data information not received. When information about a JPEG form data image is set as the output attribute data as in the seventh aspect, the user can automatically display an appropriate JPEG image without manually setting dithering, for example.

An eighth aspect is directed to a data broadcasting device provided in a broadcasting station which broadcasts multimedia data. A data broadcasting device in accordance with the eighth aspect of the present invention may comprise: a data analyzing portion for analyzing the contents of the multimedia data and generating output attribute data about the multimedia data, and a data transmitting portion for broadcasting the multimedia data together with a corresponding piece of the output attribute data.

According to a ninth aspect, the data broadcasting device of the eighth aspect further comprises a portion for embedding the output attribute data generated by the data analyzing portion in the multimedia data, and the data transmitting portion broadcasts the multimedia data in which the output attribute data is embedded.

According to a tenth aspect, in the data broadcasting device of the eighth aspect, when the multimedia data is data in an HTML format, the output attribute data comprises information about data linked to the multimedia data, concerning at least one of its file name, the number of images contained therein, its data size, and the number of data pieces further linked thereto.

According to an eleventh aspect, in the data broadcasting device of the eighth aspect, when the multimedia data is data in a JPEG format, the output attribute data comprises information about at least one of data type of the multimedia data (a natural painting or a line drawing) and a recommended screen size suited to display of the multimedia data.

A twelfth aspect is directed to a receiving terminal device which receives multimedia data broadcast together with output attribute data. A data broadcasting device in accordance with the twelfth aspect of the present invention may comprise: a receiving portion for receiving the multimedia data and the output attribute data which are broadcast, a data managing portion for managing and storing the multimedia data and the output attribute data which are received, and a data output portion for outputting the multimedia data together with its attribute information by referring to the output attribute data.

According to a thirteenth aspect, the receiving terminal device of the twelfth aspect further comprises a data extracting portion for, when the output attribute data is embedded in the multimedia data, extracting from the received multimedia data the output attribute data embedded therein and outputting the output attribute data to the data managing portion, and the data managing portion manages the output attribute data extracted by the data extracting portion separately from the corresponding multimedia data.

According to a fourteenth aspect, the receiving terminal device of the twelfth aspect further comprises a data analyzing portion for analyzing the contents of the received multimedia data and newly generating the output attribute data about the multimedia data.

According to a fifteenth aspect, in the receiving terminal device of the twelfth aspect, the data managing portion further manages a state of reception about data linked to the multimedia data, and the data output portion outputs a state of data linked to the multimedia data by referring to the state of reception as well as the output attribute data.

A sixteenth aspect is directed to a receiving terminal device which receives broadcast multimedia data, comprising: a receiving portion for receiving the broadcast multimedia data, a data analyzing portion for analyzing the contents of the received multimedia data and generating output attribute data about the multimedia data, a data managing portion for managing and storing the received multimedia data and the generated output attribute data, and a data output portion for outputting the multimedia data together with its attribute information by referring to the output attribute data.

As stated above, the eighth to sixteenth aspects show data broadcasting devices and receiving terminal devices used in the data broadcast systems according to the first to seventh aspects. The useful effects of the present invention can thus be obtained even only with a data broadcasting device or a receiving terminal device.

Particularly, the receiving terminal device of the sixteenth aspect analyzes received multimedia data and generates output attribute data. Accordingly, even when only the multimedia data is transmitted (when the output attribute data is not transmitted), it is possible to decide in which form multimedia data stored in the receiving terminal device should be displayed on the basis of the output attribute data. Hence this receiving terminal device can b3 used as a relay center to transmit the output attribute data of the multimedia data to another terminal device.

A seventeenth aspect is directed to a data communication system comprising a data communication device for transmitting multimedia data in a JPEG format and a receiving terminal device receiving the multimedia data transmitted from the data communication device. A data communication device in accordance with a seventeenth aspect of the present invention may comprise: a data analyzing portion for analyzing the contents of the multimedia data and generating output attribute data about the multimedia data, and a data transmitting portion for transmitting the multimedia data together with a corresponding piece of the output attribute data. A receiving terminal device in accordance with a seventeenth aspect of the present invention may comprise: a receiving portion for receiving the multimedia data and the output attribute data which are transmitted, a data managing portion for managing and storing the multimedia data and the output attribute data which are received, and a data output portion which determines a method of displaying the multimedia data by referring to the output attribute data.

As stated above, in accordance with the seventeenth aspect, the data communication device transmits multimedia data of JPEG form and its output attribute data together and the receiving terminal device determines in which form the multimedia data is to be displayed on the basis of the output attribute data. Accordingly the receiving terminal device can automatically display an appropriate JPEG image as soon as it receives the data.

According to an eighteenth aspect, in the data communication system of the seventeenth aspect, the data communication device further comprises a portion for embedding the output attribute data generated by the data analyzing portion in the multimedia data, and the data transmitting portion transmits the multimedia data in which the output attribute data is embedded.

As stated above, in accordance with the eighteenth aspect, the data communication device embeds generated output attribute data in the multimedia data and transmits the same. Accordingly the receiving terminal device does not have to separately manage the multimedia data and the output attribute data; it can collectively manage the multimedia data. This allows a reduction in capacity of the storage device of the receiving terminal device. Further, the receiving terminal device can obtain the output attribute data by referring only to the multimedia data to be displayed. Moreover, the receiving terminal device can send/receive the output attribute data by sending/receiving the multimedia data.

According to nineteenth aspect, in the data communication system of the eighteenth aspect, the receiving terminal device further comprises a data extracting portion for extracting from the received multimedia data the output attribute data embedded therein and outputting the output attribute data to the data managing portion, and the data managing portion manages the output attribute data extracted by the data extracting portion separately from the corresponding multimedia data.

As stated above, in accordance with the nineteenth aspect, the receiving terminal device extracts the output attribute data embedded in the multimedia data and separately manages the output attribute data and the multimedia data. Accordingly the multimedia data broadcast together with the output attribute data embedded therein is stored in the original form of the multimedia data in the receiving terminal device. Therefore it is possible to secure for the user that the data stored in the receiving terminal device is not altered. Further, the receiving terminal device can send/receive the multimedia data in its original form intended by the data provider.

According to a twentieth aspect, in the data communication system of the seventeenth aspect, the data analyzing portion generates the output attribute data showing data type of the multimedia data (a natural painting or a line drawing), and the data output portion determines whether or not to apply dithering to the multimedia data when displaying the multimedia data on the basis of the data type.

According to a twenty-first aspect, in the data communication system of the seventeenth aspect, the data analyzing portion generates the output attribute data showing a recommended screen size suited to display of the multimedia data, and the data output portion determines whether or not to apply dithering to the multimedia data when displaying the multimedia data on the basis of a result of comparison between the recommended screen size and the size of a screen in which the multimedia data is actually displayed.

As stated above, the twentieth and twenty-first aspects show typical output attribute data information about JPEG multimedia data. The receiving terminal device can thus automatically display an appropriate JPEG image without manually setting dithering as soon as it receives the data.

A twenty-second aspect is directed to a data communication device which makes communications of multimedia data in a JPEG format. A data communication device in accordance with the twenty-second aspect of the present invention may comprise: a data analyzing portion for analyzing the contents of the multimedia data to generate output attribute data comprising information about at least one of data type of the multimedia data (a natural painting or a line drawing) and a recommended screen size suited to display of the multimedia data; and a data transmitting portion for transmitting the multimedia data together with the corresponding output attribute data.

According to a twenty-third aspect, the data communication device of the twenty-second aspect further comprises a portion for embedding the output attribute data generated by the data analyzing portion in the multimedia data, and the data transmitting portion transmits the multimedia data in which the output attribute data is embedded.

A twenty-fourth aspect is directed to a receiving terminal device which receives multimedia data in a JPEG format which is transmitted together with output attribute data, the output attribute data comprising information about at least one of data type of the multimedia data (a natural painting or a line drawing) and a recommended screen size suited to display of the multimedia data. A receiving terminal device in accordance with the twenty-fourth aspect of the present invention may comprise: a receiving portion for receiving the multimedia data and the output attribute data which are transmitted; a data managing portion for managing and storing the multimedia data and the output attribute data which are received; and a data output portion which determines a method of displaying the multimedia data by referring to the output attribute data.

According to a twenty-fifth aspect, the receiving terminal device of the twenty-fourth aspect further comprises a data extracting portion for, when the output attribute data is embedded in the multimedia data, extracting from the received multimedia data the output attribute data embedded therein and outputting the output attribute data to the data managing portion, and the data managing portion manages the output attribute data extracted by the data extracting portion separately from the corresponding multimedia data.

According to a twenty-sixth aspect, in the receiving terminal device of the twenty-fourth aspect, the data output portion determines whether or not to apply dithering to the multimedia data when displaying the multimedia data on the basis of the data type.

According to a twenty-seventh aspect, in the receiving terminal device of the twenty-fourth aspect, the data output portion determines whether or not to apply dithering to the multimedia data when displaying the multimedia data on the basis of a comparison between the recommended screen size and the size of a screen in which the multimedia data is actually displayed.

A twenty-eighty aspect is directed to a receiving terminal device which receives transmitted multimedia data in a JPEG format, comprising: a receiving portion for receiving the transmitted multimedia data; a data analyzing portion for analyzing the contents of the received multimedia data to generate output attribute data about data type (a natural painting or a line drawing) of the multimedia data; a data managing portion for managing and storing the received multimedia data and the generated output attribute data; and a data output portion which determines a method of displaying the multimedia data by referring to the output attribute data.

As stated above, the twenty-second to twenty-eighth aspects show data communication devices and receiving terminal devices used in the data communication systems of the seventeenth to twenty-first aspects. The useful effects of the present invention can thus be obtained even only with a data communication device or a receiving terminal device.

Particularly, the receiving terminal device of the twenty-eighth aspect analyzes received multimedia data and generates output attribute data. Accordingly, even when only the multimedia data is transmitted (when the output attribute data is not transmitted), it is possible to decide in which form multimedia data stored in the receiving terminal device should be displayed on the basis of the output attribute data. Hence this receiving terminal device can be used as a relay center to transmit the output attribute data of the multimedia data to another terminal device.

A twenty-ninth aspect is directed to a recording medium on which a program to be executed on a computer device is recorded for realizing an operation environment on the computer device. A program in accordance with the twenty-ninth aspect of the present invention may comprise: receiving multimedia data and output attribute data accompanying the multimedia data; managing and storing the multimedia data and the output attribute data received; and outputting the multimedia data together with its attribute information by referring to the output attribute data.

A thirtieth aspect is directed to a recording medium on which a program to be executed on a computer device is recorded for realizing an operation environment on the computer device. A program in accordance with the thirtieth aspect of the present invention may comprise: analyzing the contents of multimedia data in a JPEG format to generate output attribute data comprising information about at least one of data type of the multimedia data (a natural painting or a line drawing) and a recommended screen size suited to display of the multimedia data; and transmitting the multimedia data together with the corresponding output attribute data.

A thirty-first aspect is directed to a recording medium on which a program to be executed on a computer device is recorded for realizing an operation environment on the computer device. A program in accordance with the thirty-first aspect of the present invention may comprise: receiving multimedia data in a JPEG format and output attribute data comprising information about at least one of its data type (a natural painting or a line drawing) and a recommended screen size suited to its display; managing and storing the multimedia data and the output attribute data received; and determining a method of displaying the multimedia data on the basis of the output attribute data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a data broadcast system according to an embodiment of the present invention.

FIG. 11 is a diagram showing examples of screen displays presented in the data display portion 25.

FIG. 13 is a flowchart showing an example of a process in which the receiving terminal device 2 sets an output attribute of JPEG data.

DESCRIPTION OF THE PREFERRED EMBODIMENTS

Figures 2, 3:
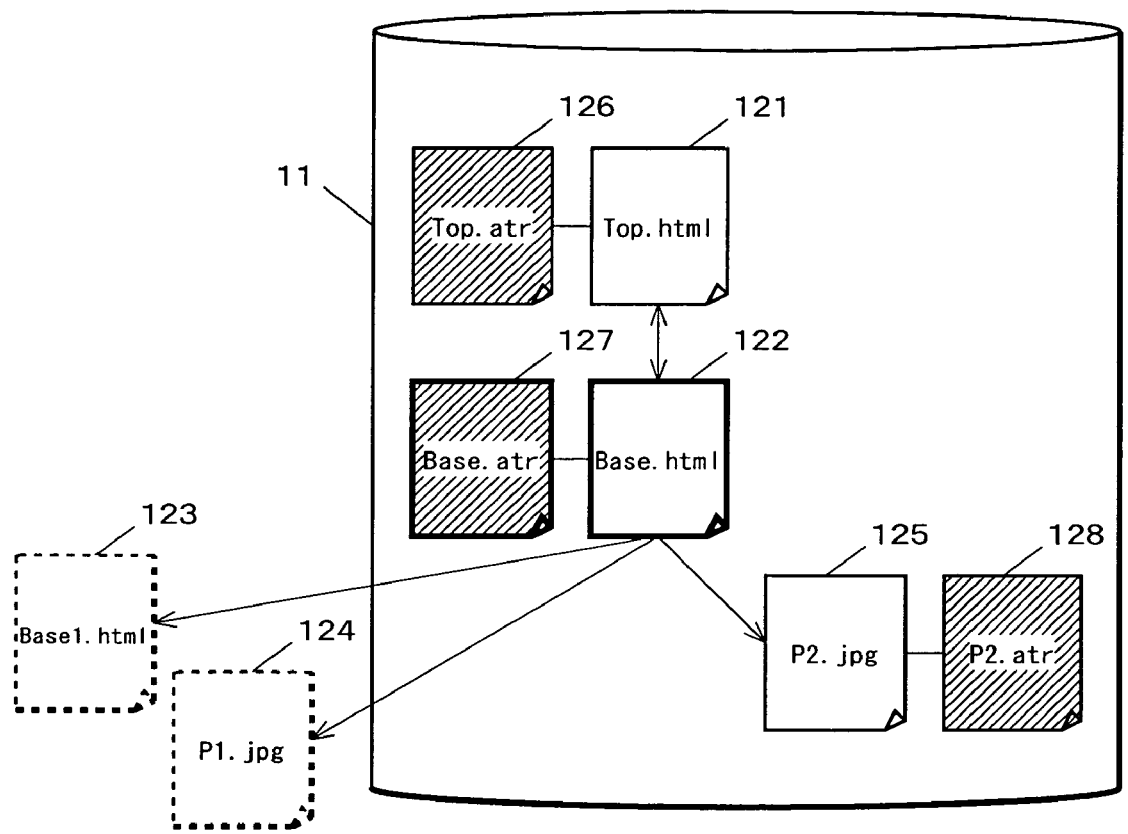
FIG. 2 is a diagram showing an example of the relation among multimedia data.
FIG. 3 is a diagram showing an example of a table 130 defining types of multimedia data.

An embodiment of the present invention will now be described referring to the drawings.

FIG. 1 is a block diagram showing the structure of a data broadcast system according to an embodiment of the invention. In FIG. 1, the data broadcast system of this embodiment includes a data broadcasting device 1 for broadcasting multimedia data and a receiving terminal device 2 for receiving the broadcast multimedia data and displaying the multimedia data according to instructions from a user.

First, the structure of the data broadcasting device 1 in the data broadcast system of this embodiment will be described in detail. Referring to FIG. 1, the data broadcasting device 1 includes a data storage portion 11, a file manager 12, a data analyzing portion 13, a protocol encoder 14, and a transmitter 15.

The file manager 12 manages data stored in the data storage portion 11. The file manager 12 also controls data reading and data writing from and in the data storage portion 11. The data analyzing portion 13 analyzes multimedia data obtained from the data storage portion 11 through the file manager 12 and generates their output attribute data. The generated output attribute data are outputted to the file manager 12 and stored in the data storage portion 11 in a predetermined form. The data storage portion 11 is used to store the multimedia data and output attribute data. The output attribute data is data which is referred to when the receiving terminal device 2 displays the multimedia data.

For the form in which the output attribute data is stored in the data storage portion 11, the output attribute data may be stored in a separate file associated with the corresponding multimedia data, or the output attribute data may be embedded in the corresponding multimedia data and stored, for example.

The multimedia data and output attribute data outputted from the file manager 12 undergo a predetermined encoding process (e.g. multiple encoding in DAB) in the protocol encoder and are broadcast toward the receiving terminal device 2 through the transmitter 15.

For the method of encoding the output attribute data, the output attribute data may be encoded alone or may be embedded in the multimedia data and encoded.

Next the structure of the receiving terminal device 2 in the data broadcast system of this embodiment will be described in detail.

Referring to FIG. 1, the receiving terminal device 2 includes a tuner 21, a protocol decoder 22, a file manager 23, a data analyzing portion 24, a data storage portion 25, and a data display portion 26.

The tuner 21 receives the encoded multimedia data and output attribute data broadcast from the data broadcasting device 1. The protocol decoder 22 decodes the data received at the tuner 21 to restore the original multimedia data and output attribute data. The restored data are outputted to the file manager 23. The file manager 23 manages data stored in the data storage portion 25. The file manager 23 also controls data reading and data writing from and in the data storage portion 25. When the output attribute data is embedded in the multimedia data, the data analyzing portion 24 separates the output attribute data from the multimedia data when required. When the output attribute data and the multimedia data are in separate files, the data analyzing portion 24 embeds the output attribute data in the multimedia data when required. The file manager 23 stores the multimedia data and the output attribute data in the data storage portion 25. The file manager 23 reads the stored data at any time according to an instruction from a user, and the contents of the data are displayed in the data display portion 26. When multimedia data is displayed in the data display portion 26, the output attribute data corresponding to that multimedia data is referred to and the additional information based on the output attribute data is displayed together.

Now more specifically discussed referring to FIGS. 2 to 7 are the processes in which the data broadcast system of the embodiment of the invention generates, distributes and receives the output attribute data and displays the multimedia data using the output attribute data.

In this embodiment of the invention, HTML data is explained as an example of multimedia data having a link structure and JPEG data is explained as an example of multimedia data of images, and methods for generating their output attribute data will be described.

First, a relation among data is described referring to FIG. 2. FIG. 2 shows the relation among multimedia data used in the description below.

Data 121 to data 123 are HTML data (with extensions [.html]). Data 124 and data 125 are JPEG data (with extensions [.jpg]). Data 126 to data 128 are output attribute data generated from the data 121, data 122 and data 125, respectively (with extensions [.atr] in this example). The data 123 and data 124 externally exist. Seen from the data broadcasting device 1, the external data are multimedia data existing on the Internet, for example, which are, seen from the receiving terminal device 2, multimedia data not received, or not stored in the data storage portion 25.

It is assumed that the data 121 and the data 122 are linked bidirectionally and that the data 122 is linked to the data 123 to data 125 (the linked relationship is shown by arrows in FIG. 2).

FIG. 3 is a diagram showing an example of a table 130 defining types of the multimedia data. In the table 130 of FIG. 3, multimedia data are provided with data type IDs and signs in correspondence with their type.

HTML data has a data type ID "0" and a sign "L". The sign "L" is the initial letter of "LINK". JPEG natural painting data has a data type ID "1" and a sign "P." The sign "P" is the initial letter of "PAINT." JPEG line drawing data has a data type ID "2" and a sign "D." The sign "D" is the initial letter of "DRAW." The numbers and letters used in the data type IDs and signs are just examples, which can be freely customized as long as they match between the data broadcasting device 1 and the receiving terminal device 2.

Figure 4:
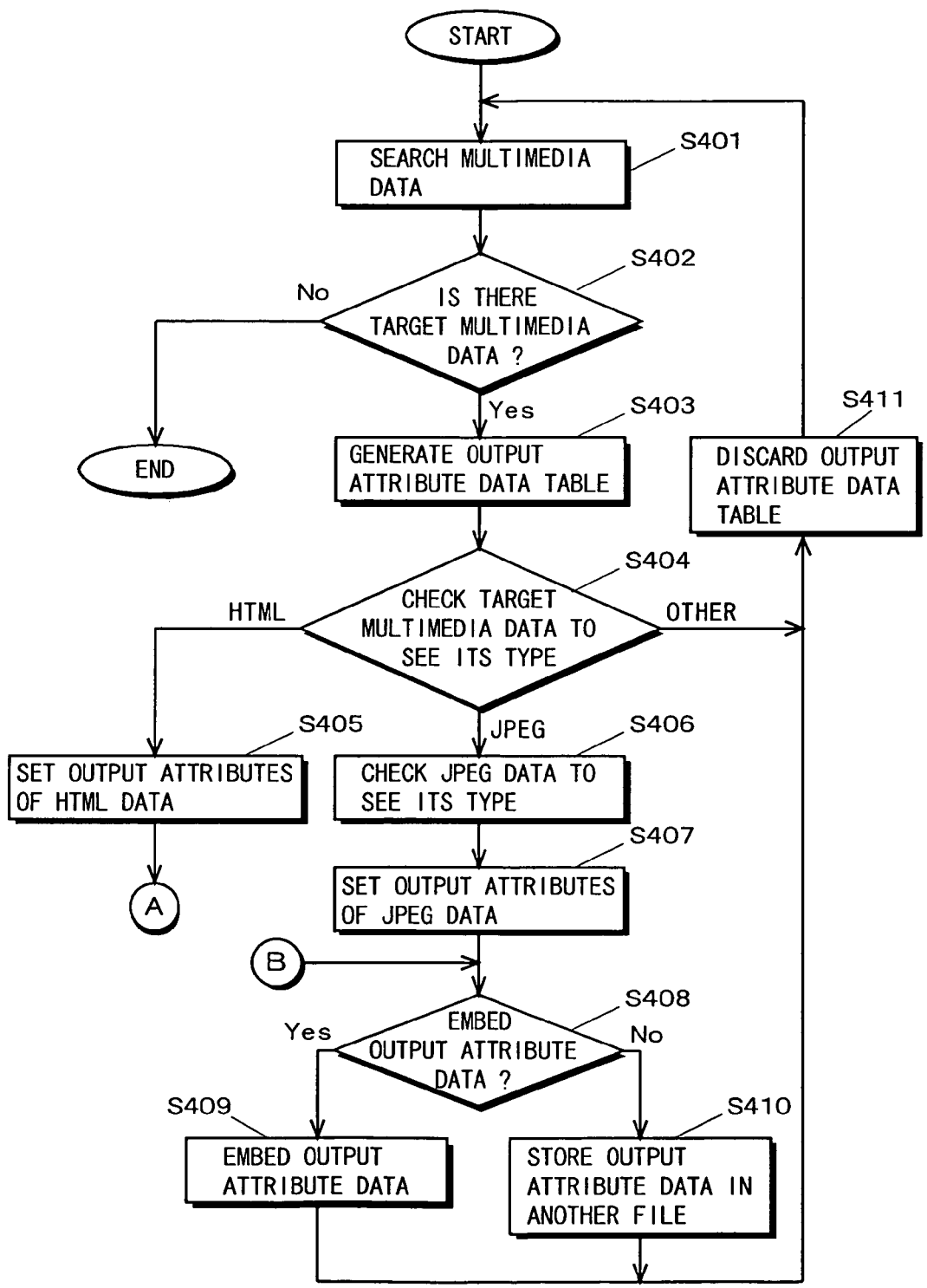
FIG. 4 is a flowchart showing one example of a process in which the data broadcasting device 1 generates output attribute data from multimedia data.
Figure 5:
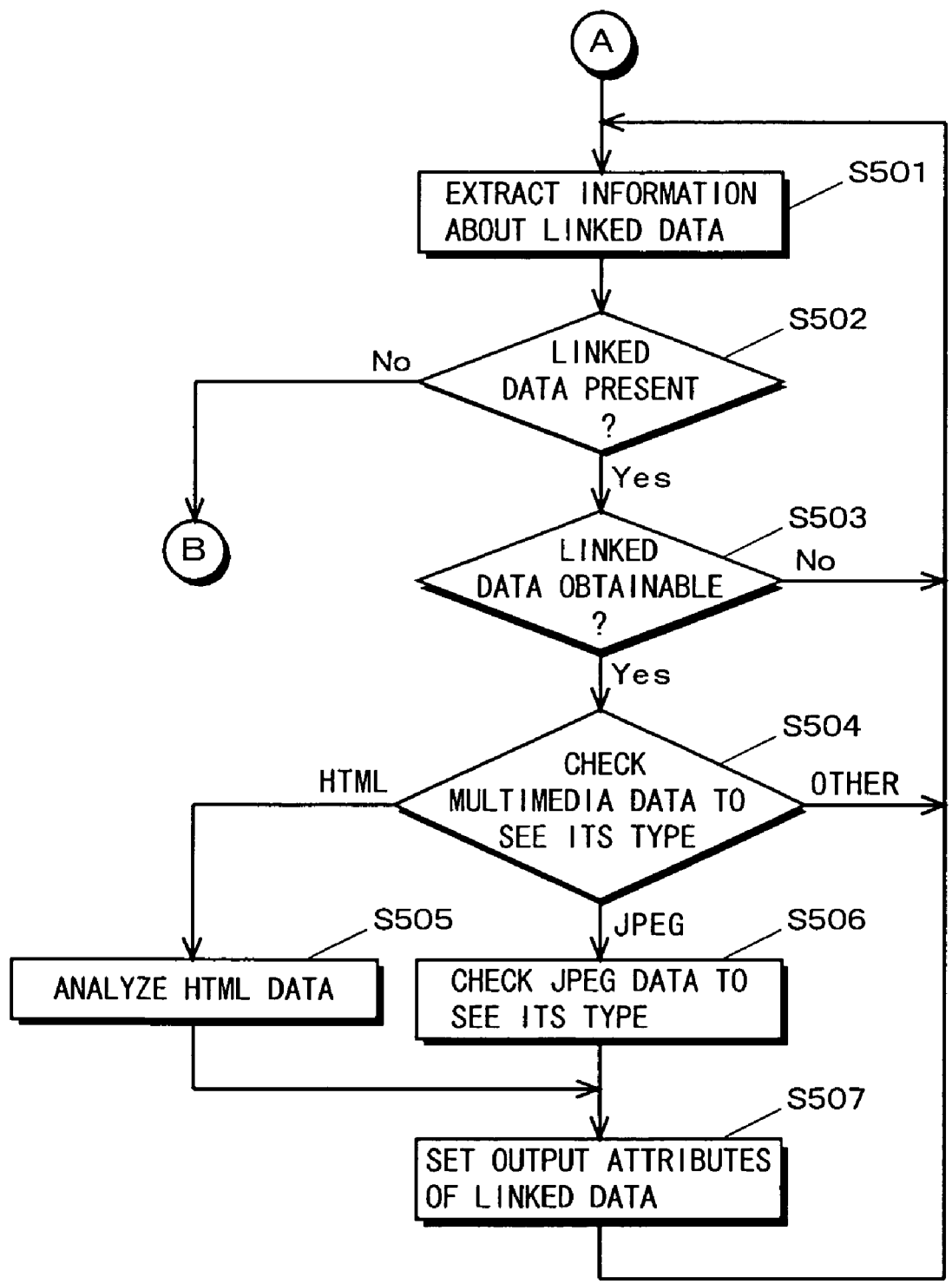
FIG. 5 is a flowchart showing another example of a process in which the data broadcasting device 1 generates output attribute data from multimedia data.

Now discussed referring to FIGS. 4 and 5 is how the data broadcasting device 1 generates and manages the output attribute data considering the link information of HTML data and the type information of JPEG data, where the data related as shown above are used.

First, referring to FIG. 4, the data broadcasting device 1 searches the multimedia data in the data storage portion 11 (step S401) and decides whether there is any multimedia data for which the output attribute data is to be generated (hereinafter referred to as target multimedia data; step S402). The target searched for in step S402 is basically multimedia data with which the output attribute data has not generated yet. However, when updating existing data, for example, multimedia data whose output attribute data has been already generated may be the target. When the decision made in step S402 shows that there is target multimedia data, the data broadcasting device 1 generates an output attribute data table (step S403). On the other hand, when the decision in step S402 shows absence of target multimedia data, the data broadcasting device 1 ends this process. The output attribute data will be described in detail later.

Next the data broadcasting device 1 decides the type of the target multimedia data (step S404). In this embodiment, the step S404 decides whether the multimedia data is in the HTML form, JPEG form, or other form. When the decision of step S404 shows that the target multimedia data is HTML data, the data broadcasting device 1 generates HTML form output attribute data and sets the data in the output attribute data table (step S405). When the decision made in step S404 shows that the target multimedia data is JPEG data, the data broadcasting device 1 further decides which image type the JPEG data is of (whether it is a natural painting or line drawing; see FIG. 3) (step S406). The data broadcasting device 1 then generates output attribute data of the JPEG form on the basis of the image type and sets the data in the output attributes data table (step S407). On the other hand, if the decision made in step S404 shows that the target multimedia data is data other than HTML and JPEG, the data broadcasting device 1 discards the output attribute data table generated in step S403 (step S411) and returns to S401 to search for next multimedia data.

The type of the multimedia data can be usually found with ease through the extension added to the file name.

Next, when the target multimedia data is HTML data, the data broadcasting device 1 operates to generate the output attribute data about multimedia data linked to the HTML data (linked data).

Referring to FIG. 5, after setting the output attribute data of the target multimedia data (step S405), the data broadcasting device 1 takes out information about linked data in the target multimedia data (step S501). The data broadcasting device 1 then decides, on the basis of the information taken out, whether any linked data is present (inside or outside the data storage portion 11; step S502) and whether the linked data is obtainable (step S503). When the decision of step S502 shows absence of linked data, the data broadcasting device 1 moves to step S408 without generating output attribute data about linked data. When the decision of step S503 shows that the linked data is not obtainable, the flow returns to step S501 to take out information about the next linked data.

When the decision made in step S503 shows that the linked data can be obtained, the data broadcasting device 1 obtains the linked data and decides its type (step S504). In this embodiment, the step S504 decides whether the multimedia data is in the HTML form, JPEG form or other form. If the decision made in step S504 shows that the linked data is HTML data, the data broadcasting device 1 analyzes the HTML data (step S505), generates the output attribute data of the HTML form and sets the data in the output attribute data table (step S507). When the decision made in step S504 shows that the linked data is JPEG data, the data broadcasting device 1 further decides the image type of the JPEG data (step S506). The data broadcasting device 1 then generates the output attribute data of JPEG form on the basis of the image type and sets the data in the output attribute data table (step S507). When the decision of step S504 shows that the linked data is data other than HTML and JPEG, the data broadcasting device 1 returns to step S501 to take out information about the next linked data.

The processing in steps S501 to S507 are applied to all linked data in the target multimedia data.

Referring to FIG. 4 again, the data broadcasting device 1 next decides whether to embed the set output attribute data in the target multimedia data (step S408). The decision made in step S408 as to whether to embed may be given on the basis of a flag, etc., specified by a user, or may be defined in the system in advance, or may be decided for each piece of multimedia data. The method of making decision can be arbitrarily decided in the system. When the step S408 decides to embed, the data broadcasting device 1 then embeds the output attribute data in the target multimedia data (step S409); when it decides not to embed, the data broadcasting device 1 stores the output attribute data as another file in the data storage portion 11 (step S410). When the output attribute data is stored as a separate file, the output attribute data can be associated with the target multimedia data by giving the file the same name as the target multimedia data and an extension [.atr].

Next the structure of the output attribute data is specifically explained.

Figure 6:
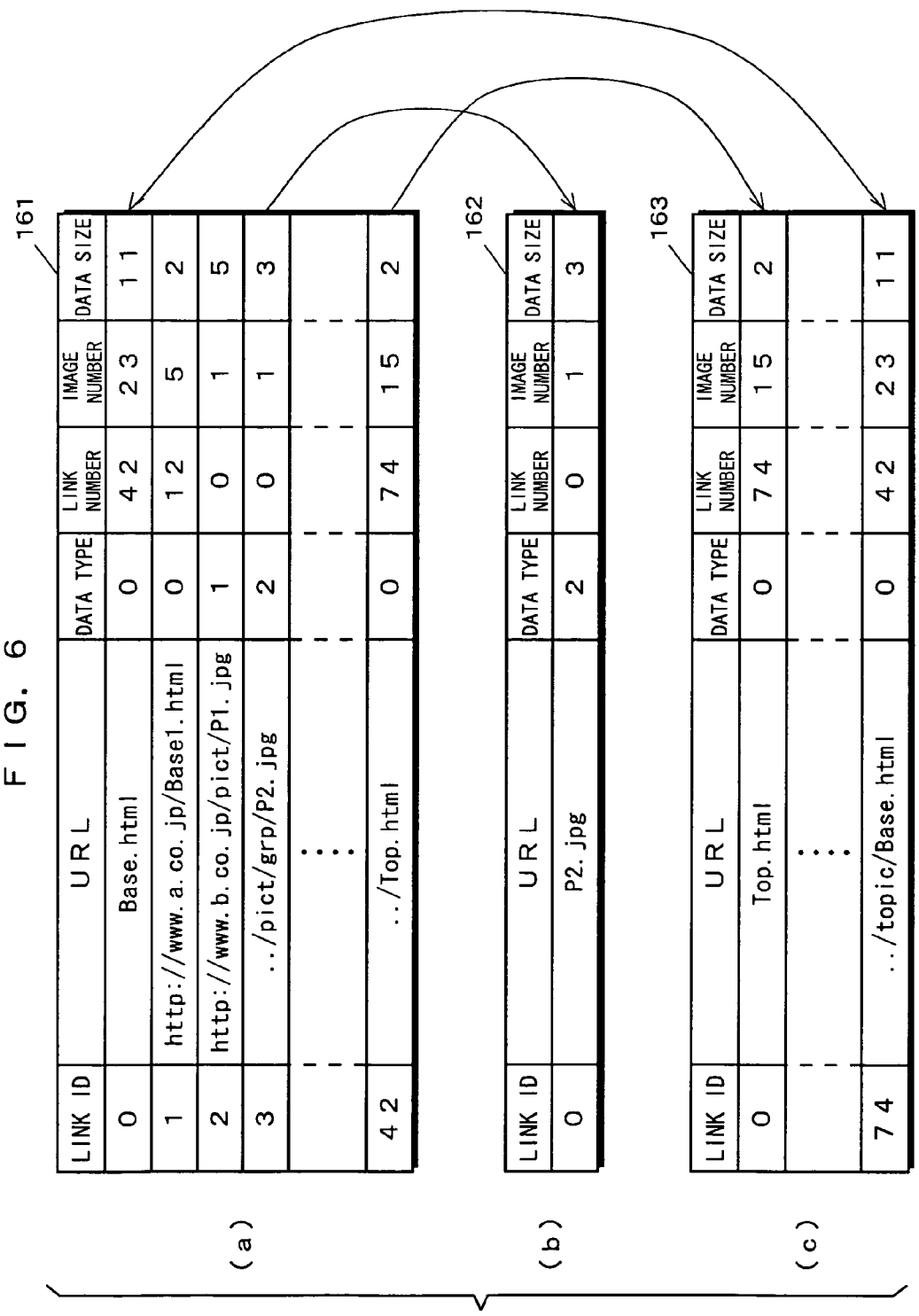
FIG. 6 is a diagram showing examples of output attribute data tables for storing the output attribute data.

FIG. 6 is a diagram showing specific examples of the output attribute data table for storing the output attribute data.

Figure 7:
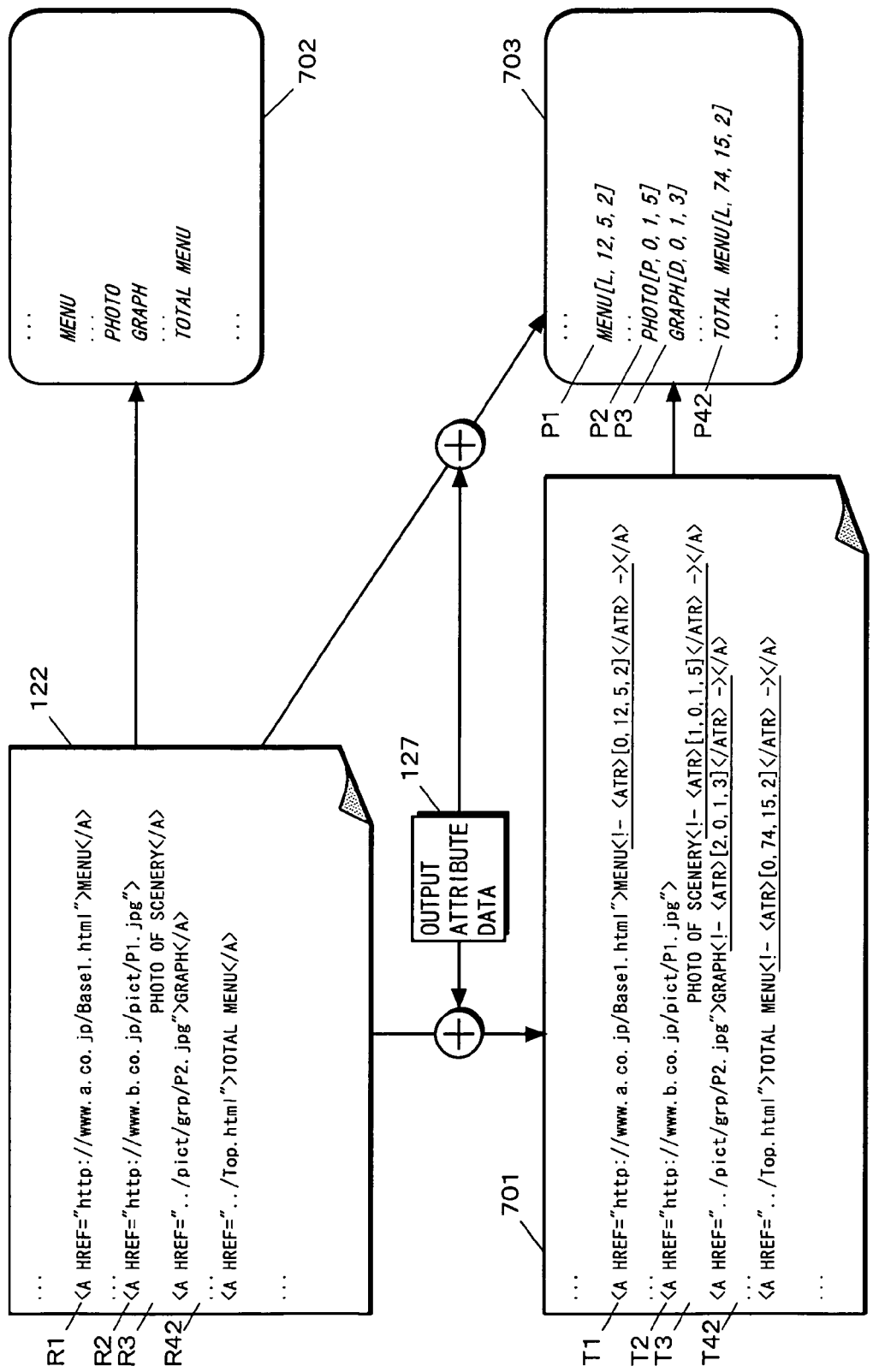
FIG. 7 is a diagram showing examples of output attribute data embedded in HTML data and screens displaying the data.

The table 161 shown in (a) of FIG. 6 is an output attribute data table showing the contents of the output attribute data 127 [Base.atr] about the HTML data 122 [Base.html] of FIG. 2. The HTML data 122 is HTML data as shown in FIG. 7. The table 162 shown in (b) of FIG. 6 is an output attribute data table showing the contents of the output attribute data 128 [P2.atr] about the JPEG data 125 [P2.jpg] of FIG. 2. The table 163 shown in (c) of FIG. 6 is an output attribute data table showing the contents of the output attribute data 126 [Top.atr] about the HTML data 121 [Top.html] of FIG. 2.

The table 161 shows a plurality of items which are recorded as the output attribute data in the column direction. The output attribute data are recorded in the row direction in the table 161 for each piece of data linked to the target multimedia data.

The link ID is an identification code assigned to the linked data in the HTML data 122. The link IDs are managed with serial numbers starting from "0"; the link ID=0 specifically shows the output attribute data of the target multimedia data with which the output attribute data table is associated. That is to say, the output attribute data of the HTML data 122 is recorded in the link ID=0 in the table 161. Since the maximum value of the link ID in the table 161 is "42," it is known that 42 links to multimedia data are in the HTML data 122. Character strings showing the storage locations of the linked data are recorded in URL (Uniform Resource Locator). These character strings are each set within a link tag represented by "<A>" and "</A>" in the HTML format data. The values of the data type ID defined in the aforementioned table 130 of FIG. 3 are recorded as the data type in accordance with the type of the linked data. The number of links to multimedia data in the linked data is recorded as the link number. When the linked data is not in the HTML format, e.g. when it is JPEG data, then the value "0" is recorded in the link number. Recorded in the image number is the number of sheets of images included in the linked data. When the linked data is not in the HTML format, e.g. when it is JPEG data, the value "1" is recorded in the image number. The amount of data of the linked data represented in Kbytes is recorded as the data size.

It is known from the table 161 containing the linked data information that 42 pieces of linked data are in the HTML data 122; the following items can be known about the linked data by referring to the records: the URL, data type, number of links, number of images and data size.

A specific example of analysis of the HTML data 122 shown in FIG. 7 is described with reference to (a) of FIG. 6.

First, the output attribute data of the HTML data 122 itself is recorded in the record of link ID=0. The output attribute data shows the following information: the URL of the HTML data 122 is file name [Base.html], the data type is HTML, the number of links is 42, the number of images is 23, and the data size is about 11 Kbytes. It is easily known from the extension [-.html] that the data type is HTML. The link number=42 in the record of link ID=0 coincides with the maximum value 42 of the link ID in the table 161, and the image number=23 coincides with the number of records of the data type 1 or 2 in the table 161.

Next, the record of link ID=1 contains the output attribute data of the linked data corresponding to the link tag R1 in the HTML data 122. This output attribute data shows that the linked data of the link tag R1 resides in an external WWW server and its data type is HTML. That the linked data resides in an external WWW server is easily known from the URL [http://www-]. Further, the following information can be obtained about the linked data [Base1.html] by analyzing the data: the link number is 12, the image number is 5 and the data size is about 2 Kbytes. The link number, image number and data size can be obtained by extracting image tags or link tags of the target HTML data and analyzing the contents specified there.

Next, the record of the link ID=2 contains the output attribute data of the linked data corresponding to the link tag R2 in the HTML data 122. The output attribute data shows that the linked data of the link tag R2 resides in an external WWW server and its data type is JPEG. It is easily known from the extension [-.jpg] that the data type is JPEG. Further, it is known by analyzing the linked data [P1.jpg] that the data [P1.jpg] is a natural painting and the data size is about 5 Kbytes. Since the data [P1.jpg] is JPEG data, the link number is 0 and the image number is 1. The image type of the JPEG data can be found by a known technique used in image recognition. For example, whether JPEG data is a line drawing or natural painting can be generally decided through the distribution of color density of the image. For the color density, a line drawing exhibits a rapidly varying distribution and a natural painting exhibits a gentle distribution. Accordingly the two can be distinguished by calculating the color density differences between adjacent pixels and analyzing them with a proper threshold.

Next, the record of the link ID=3 contains the output attribute data of the linked data corresponding to the link tag R3 in the HTML data 122. The output attribute data shows that the linked data of the link tag R3 resides in the data storage portion 11 and its data type is JPEG. It is easily known from the URL[../-] that the linked data resides in the data storage portion 11. Further, it is known by analyzing the linked data [P2.jpg] that the data [P2.jpg] is a line drawing and the data size is about 3 Kbytes. Since the data [P2.jpg] is JPEG data, the link number is 0 and the image number is 1.

Similarly, the record of the link ID=42 contains the output attribute data of the linked data corresponding to the link tag R42 in the HTML data 122. The output attribute data shows that the linked data of the link tag R42 resides in the data storage portion 11 and its data type is HTML. Further, it is known by analyzing the linked data [/Top.html] that the link number of the data [/Top.html] is 74, the image number is 15, and the data size is about 2 Kbytes.

The table 163 shown in (c) of FIG. 6 is an output attribute data table showing the contents of the output attribute data 126 [Top.atr] about the HTML data 121 [Top.html] of FIG. 2. While the contents of the table 163 are not described here since they are clear from the description about the table 161, the contents of the record of the link ID=0 in the table 163 are the same as the record in the link ID=42 in the table 161 except the URL. The URL is represented in different ways in the table 161 and the table 163 though they describe the same multimedia data, since the two tables are associated with different entities (multimedia data).

The contents of the record of the link ID=74 in the table 163 are the same as the record of the link ID=0 in the table 161 except the URL.

The table 162 shown in (b) of FIG. 6 is an output attribute data table showing the contents of the output attribute data 128 [P2.atr] about the JPEG data 125 [P2.jpg] of FIG. 2. Since the data [P2.jpg] is JPEG data, it has no link to other multimedia data. Accordingly its output attribute data only contains the record of the link ID=0 showing the contents of the target multimedia data itself. The contents set in the link ID=0 are the same as the record of the link ID=3 in the table 161 shown in (a) of FIG. 6 except the URL.

As has been explained about the steps S409 and S410 in the flowchart of FIG. 4, the generated output attribute data is embedded in the target multimedia data or is stored in a separate file. When the output attribute data is stored in a separate file, it is easily known by changing the extension as described above that the file is a storage of output attribute data and to which multimedia data file the file is related.

Hence, next, a method of storing the output attribute data while embedding it in the multimedia data will be described below in examples of multimedia data of the HTML format and the JPEG format.

First, a method of embedding the output attribute data in HTML data is described.

Referring to FIG. 7, the link tags R1, R2 . . . R42 in the HTML data 122 correspond to the records of the link IDs=1, 2 . . . 42 in the table 161 shown in (a) of FIG. 6. The output attribute data 127 in FIG. 7 corresponds to the table 161 shown in (a) of FIG. 6.

The data 701 shown in FIG. 7 is a diagram showing the output attribute data 127 embedded in the HTML data 122. In the data 701, the underlined text parts correspond to the embedded output attribute data. Note that the underlines are provided only for description, which are absent in practice.

The underlined parts (surrounded by "<!-" to "->") are handled as comments in the HTML format, which are not displayed in the data display portion 26. In the example of this embodiment, a new ATR tag is defined in the comment part; the output attribute data is embedded in the part surrounded by "<ATR>" to "</ATR>." The output attribute data is composed of the four numbers surrounded by "[" and "]" and sectioned by ",". These four numbers respectively correspond to the items set in the table 161 shown in (a) of FIG. 6; the first item shows the data type, the second item shows the link number, the third item shows the image number and the fourth item shows the data size. The link tag T1 of the data 701 contains the following output attributes embedded therein: data type=0, link number=12, image number=5, and data size=2.

Next, a method for embedding the output attribute data in JPEG data will be described.

The format of JPEG data contains a region called application data segment, where arbitrary values other than the image data are set and used. In the example of this embodiment, the image type of JPEG data described above is embedded in this region.

The structure of the JPEG data is described in detail in "ITU-T White Book, Recommendations on Digital Still Image Compression Encoding, The ITU Association of Japan. Inc," for example.

Figure 8:
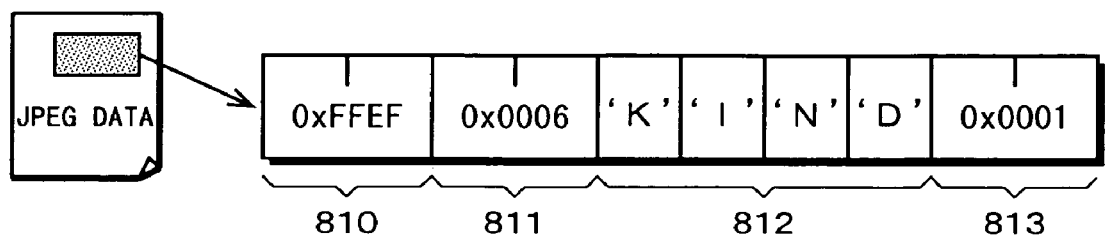
FIG. 8 is a diagram showing an example of the output attribute data embedded in JPEG data.

FIG. 8 is a diagram showing an example of the application data segment region, in which the image type of JPEG data is embedded.

A marker code indicating the meaning of the segment of the JPEG data is set in two bytes in the region 810. The JPEG standard defines 16 codes from "0xFFE0" to "0xFFEF" available as the marker code of the application data segment. The example of the embodiment uses "0xFFEF" among them. The data length of the application segment is set in the region 811; the total number of bytes of the region 812 and the region 813 is set in two bytes. In the example of this embodiment, this total number of bytes is six bytes. A character code is set in the region 812, which indicates that a flag showing the image type of the JPEG data is set in the following region 813. In the example of this embodiment, four letters "K, I, N, D" are set in four bytes. In the region 813, a numerical value showing the image type of the JPEG data is set in two bytes. The value set in the region 813 is the data type shown in the table 130 of FIG. 3 bout the JPEG data. Since this value is "1" in the example shown in FIG. 8, it is known that the JPEG data is a natural painting.

The output attribute data and multimedia data described above are broadcast from the data broadcasting device 1 in a given system (e.g. DAB) and received at the receiving terminal device 2. DAB defines a transfer protocol called MOT (Multimedia Object Transfer) as the highest-order protocol for data transfer. The MOT protocol is now described.

Figure 9:
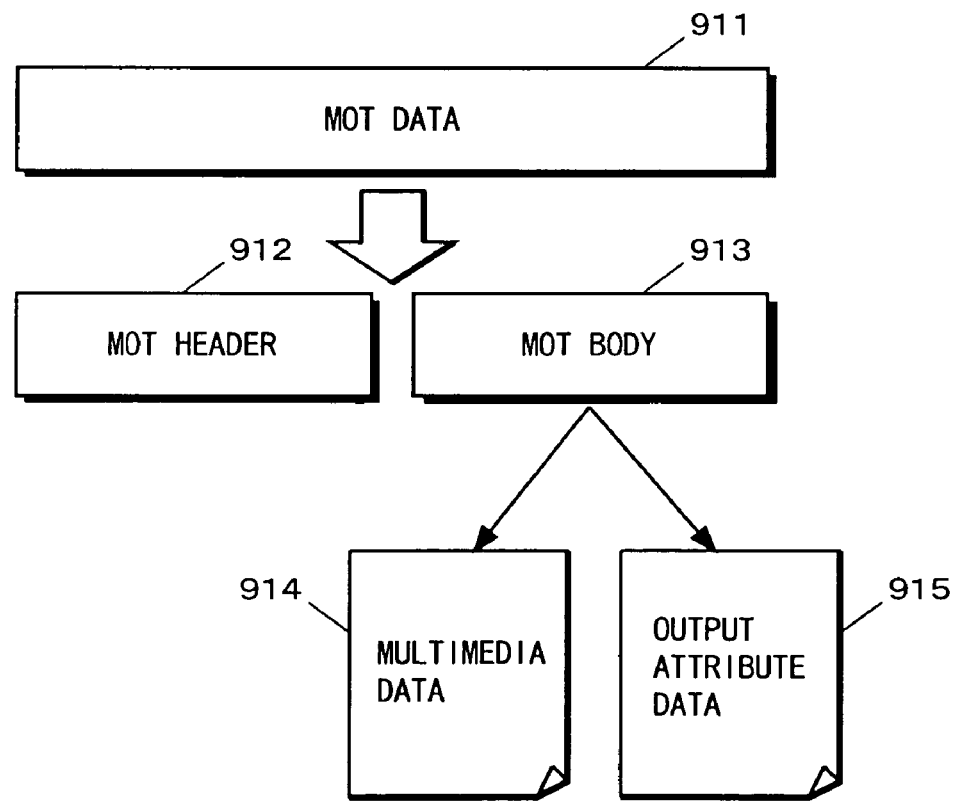
FIG. 9 is a diagram showing the structure of MOT data 911.

FIG. 9 is diagram showing the structure of MOT data 911 according to the MOT protocol. As shown in FIG. 9, the MOT data 911 is composed of a MOT header 912 and a MOT body 913. The MOT body 913 is the multimedia data. The MOT header 912 describes the attributes of the data transferred in the MOT body 913, such as the type of data, name of the data file, etc. The receiving terminal device 2 receives the MOT data 911 and takes out the multimedia data from the MOT data 911 to perform appropriate processing.

In the example of this embodiment, the multimedia data 914 and the output attribute data 915 described so far are set in the MOT body 913 and broadcast. The multimedia data present in the data broadcasting device 1 and its output attribute data can thus be transferred to the receiving terminal device 2.

In the data broadcasting device 1, the multimedia data 914 and the output attribute data 915 are stored in the MOT data 911 and then stored in a lower-order protocol of DAB (not shown) and broadcast. In the receiving terminal device 2, the tuner 21 receives the broadcast data. The protocol decoder 22 decodes the received broadcast data to the MOT data 911 and takes out the MOT header 912 and the MOT body 913. The protocol decoder 22 then outputs the MOT body 913 taken out, i.e. the multimedia data 914 and the output attribute data 915, to the file manager 23.

Next, a method of displaying the multimedia data using the received output attribute data in the receiving terminal device 2 will be described.

Now, referring to FIGS. 7, 10 to 12, examples of displaying HTML data and JPEG data will be described.

First, a method for displaying HTML data using the output attribute data about the HTML data will be described.

Figure 10:
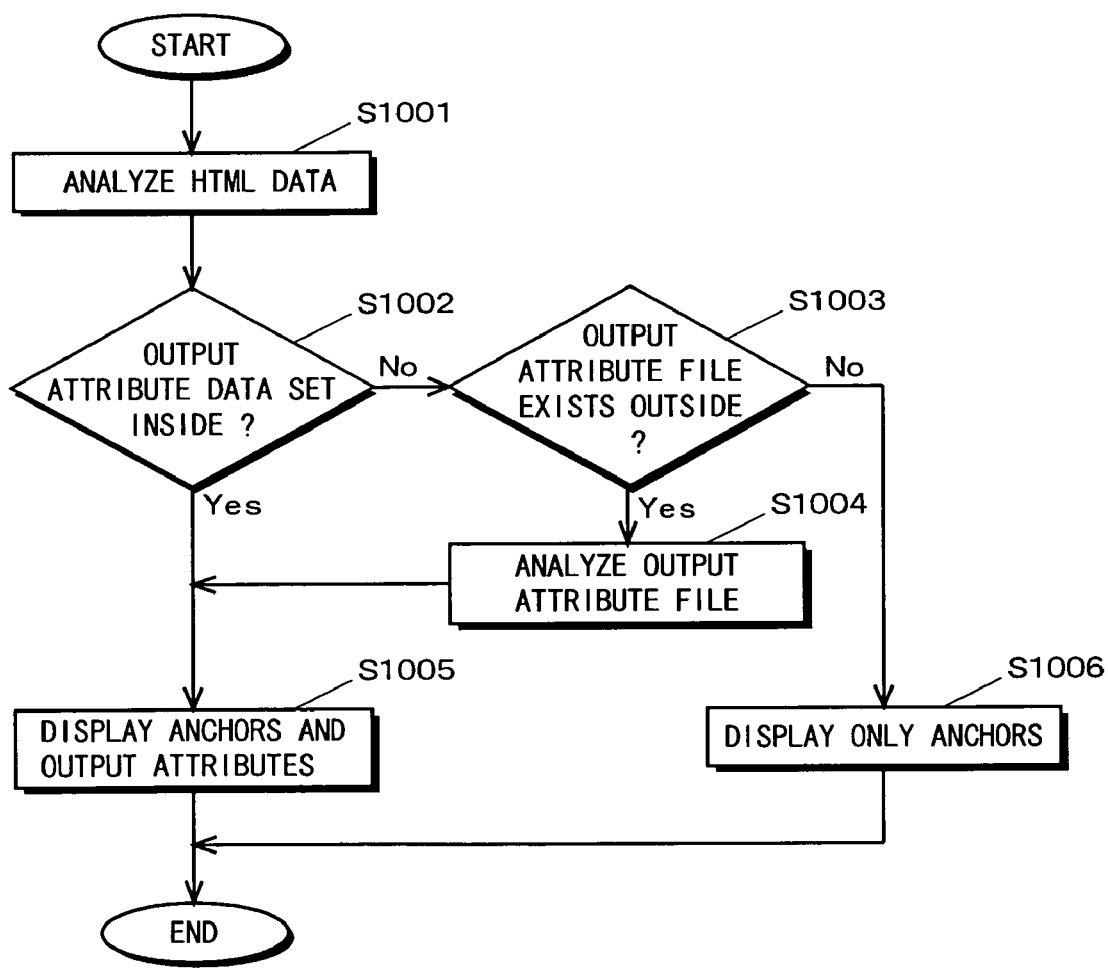
FIG. 10 is a flowchart showing an example of a process in which the receiving terminal device 2 displays HTML data using output attribute data.

Referring to FIG. 10, the receiving terminal device 2 first analyzes the structure of the display target HTML data and obtains various tag information (step S1001). At the same time, if output attributes are set in the comment line of the anchor tags, the receiving terminal device 2 obtains them. Next, the receiving terminal device 2 examines whether output attributes are set in the HTML data (and in the comment line of the anchor tags; step S1002). When the examination in step S1002 shows that output attributes are set, the receiving terminal device 2 then displays the output attributes in a given form (step S1005). When anchor tags are present, the receiving terminal device 2 displays the anchor tags and the output attributes in a given form (step S1005). When the examination in step S1002 shows that no output attributes are set, the receiving terminal device 2 decides that the output attributes of the HTML data are not set in the HTML data and further examines whether another file having the extension [.atr] and the same file name as the HTML data is present (step S1003). When the examination of step S1003 shows that another file is present, the receiving terminal device 2 analyzes the output attribute data file and obtains the output attributes (step S1004) and then displays the output attributes in a given form (step S1005). However, when the examination of step S1003 shows absence of another file, the receiving terminal device 2 displays only the anchor tags (step S1006).

More specifically, the display screen 702 in FIG. 7 is an example which displays the HTML data 122 without referring to the output attribute data 127. Display like this is presented when the data display portion 26 cannot examine the above-described link tags of the output attributes, when it intentionally does not refer to the output attribute data 127, and when the output attribute data 127 is absent, for example. In such cases, as shown in the display screen 702, the display screen of the data display portion 26 does not display information about linked data of the HTML data 122.

The display screen 703 of FIG. 7 shows an example in which the HTML data 122 is displayed referring to the output attribute data 127. The HTML data 122 can be displayed referring to the output attribute data 127 by the following two methods.

A first method is a method of referring to the output attribute data 127 when the HTML data 122 and the output attribute data 127 are present in separate files. A second method is a method of referring to the output attribute data 127 when the output attribute data 127 is embedded in the HTML data 122.

The first method is described first. The output attribute data 127 of the HTML data 122 is data as shown in the table 161 of (a) of FIG. 6. When displaying the link tags R1, R2 . . . R42 of the HTML data 122, the data display portion 26 refers to the output attribute data 127 recorded as shown in the table 161 in another file. Thus, as shown as P1, P2 . . . P42 in the display screen 703, the attributes are displayed together with the contents of the linked data. For example, the output attributes of the link tag R1 in the HTML data 122 are the values recorded in the link ID=1 in the table 161.

The items shown as P1, P2 . . . P42 in the display screen 703 show the following information: the first alphabet indicates the data type in the table 161; "L" shows the data type "0" or HTML data, "P" shows the data type "1" or JPEG natural painting data, and "D" shows the data type "2" or JPEG line drawing data. The second number shows the number of links. The third number shows the number of images. The fourth number shows the data size.

Next, the second method is described. When displaying T1, T2 . . . T42 in the data 701, the data display portion 26 refers to the output attribute data 127 set in the HTML data 122. Thus, as shown as P1, P2 . . . P42 in the display screen 703, the attributes are displayed together with the contents of the linked data. For example, since [0, 12, 5, 2] are set in T1 in the data 701, the display screen 703 displays [L, 12, 5, 2] as shown in P1.

As a result, a user can know the outline of the output attributes of the linked data of the multimedia data currently referred to without actually displaying the linked data. The user can thus efficiently refer to the data. That is to say, with the receiving terminal device 2, it is possible to know the type, link number, size, etc., of the data if the output attribute data can be obtained, even if the linked data is not received or absent in the data broadcasting device 1.

While the output attributes of related linked data are displayed in text format like letters and numerical values in this embodiment, the output attributes can be represented by icons, voice, etc., if the receiving terminal device 2 has a sufficient image display capability, etc.

The data broadcast from the data broadcasting device 1 include the three kinds: multimedia data, output attribute data, and multimedia data in which the output attribute data is embedded. However, the receiving terminal device 2 does not only store the data in the data storage portion 25 and utilize the data when presenting display in the data display portion 26. When the multimedia data and the output attribute data are in separate files, the receiving terminal device 2 may embed the output attribute data in the multimedia data and then store the data in the data storage portion 25. On the other hand, when the multimedia data embeds the output attribute data, the receiving terminal device 2 may separate the output attribute data from the multimedia data and store the multimedia data and the output attribute data in separate files in the data storage portion 25. Further, the receiving terminal device 2 may generate new output attribute data using the data analyzing portion 24 as needed.

This processing is achieved by extracting the aforementioned parts from "<!-<ATR>" to "</ATR>->" and the URLs in the link tags from HTML data embedding the output attribute data and converting them into the output attribute data table. For the output attribute data set in JPEG data, a table containing only the link ID=0 is generated on the basis of the output attribute data, where the file name of the JPEG data is recorded as URL, the image type set in the marker code "0xFFEF" is recorded as the data type, "1" is recorded as the image number, and the size of the data file expressed in Kbytes is recorded as the data size.

In this way, according to the technique described above, the type, link number, size, etc., of linked data can be previously known without displaying the linked data. Next, a technique of further improving the convenience of the user will be described, where the state of the linked data is also displayed.

As already stated, the multimedia data received at the receiving terminal device 2 is classified into multimedia data present in the data broadcasting device 1 and multimedia data present not in the data broadcasting device 1 but on the outside. The former multimedia data is sequentially broadcast according to a broadcast program and so they are received at the receiving terminal device 2 at different times. The latter multimedia data is not broadcast, so the user must externally obtain the data according to a specified protocol.

The linked data in the multimedia data that the receiving terminal device 2 displays in the screen are classified as follows:

(1) data already received at the receiving terminal device 2,
(2) data not yet received at the receiving terminal device 2,
(3) data not received at the receiving terminal device 2 through broadcasting.

However, such classification does not appear in the display screen 703 of FIG. 7. For example, when P3 corresponds to the data (2) and P42 corresponds to the data (1), the user cannot know from the display screen that the display of "total menu" is executable but the display of "graph" is not executable yet. This requires the user to try an extra operation to known whether the data has arrived.

Accordingly, the receiving terminal device 2 manages presence/absence of data reception while referring to the output attribute data as described above, thus deciding which of (1) to (3) the multimedia data correspond to. That is to say, the receiving terminal device 2 decides that multimedia data corresponds to (3) on the basis of the URL [http://www-] and decides that multimedia data corresponds to (1) or (2) on the basis of the URL [../-] and presence/absence of data reception.

The receiving terminal device 2 then presents such a screen display as shown in FIG. 11 according to the decisions. In the example of (a) of FIG. 11, for a display of linked data of (2), characters "Data has not arrived" are displayed when the select cursor is set on the screen display. In the example of (b) of FIG. 11, for a display of linked data of (3), characters "External data. Access?" are displayed when the select cursor is set on the screen display, which is followed by selectively executable items "1: Yes. 2: No".

Thus displaying the state of the linked data in the screen saves the user tracing undisplayable linked locations, thus eliminating the need of troublesome operation beforehand (the operation of returning when the linked data is absent).

Although the state of linked data is displayed with characters in the example above, it may be provided through voice output. Alternatively, it may be shown by varying the tone on the display screen independently of the position of the select cursor.

Next a method of displaying JPEG data using output attribute data about the JPEG data will be described.

Figure 12:
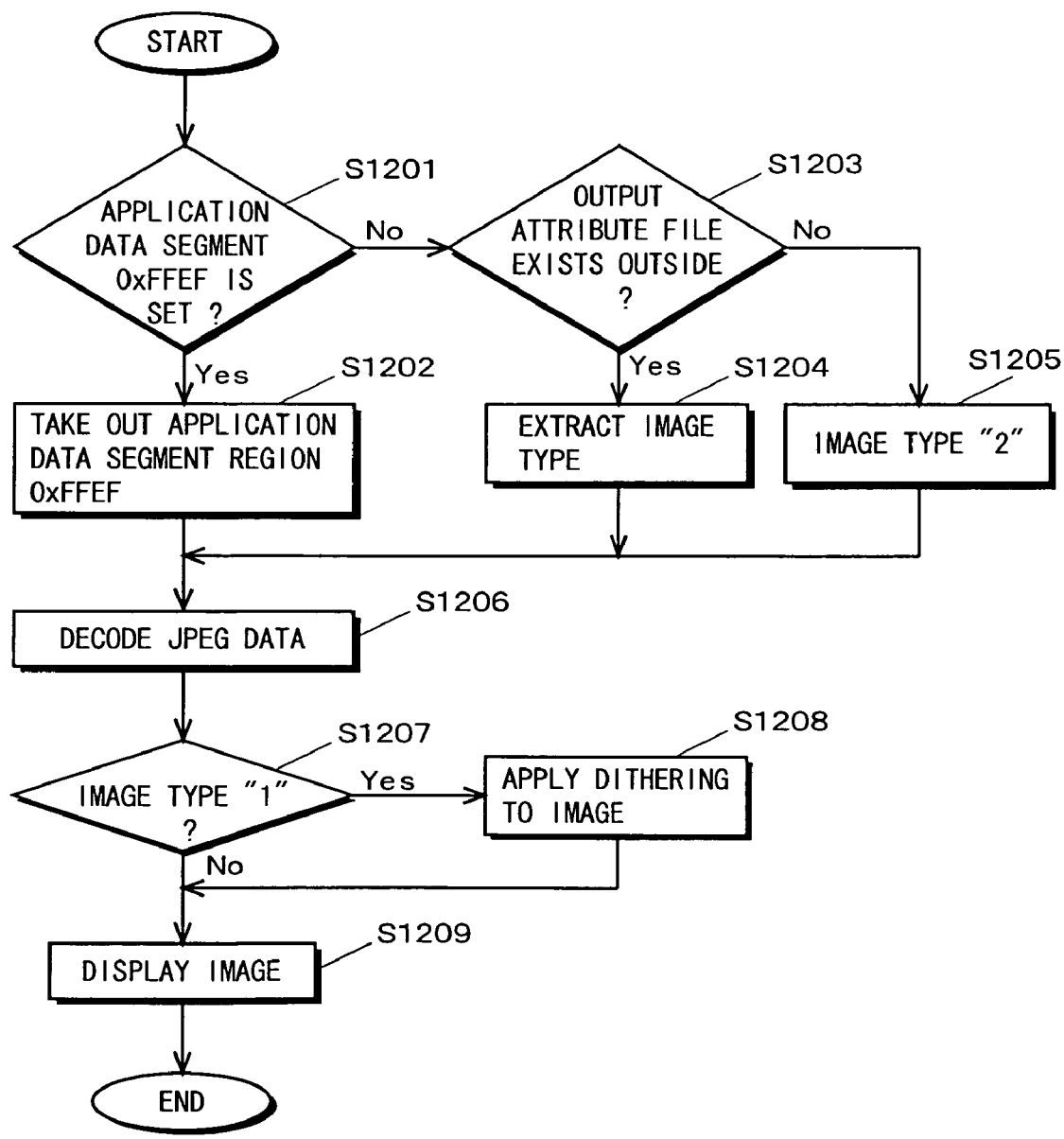
FIG. 12 is a flowchart showing an example of a process in which the receiving terminal device 2 displays JPEG data using the output attribute data.

Referring to FIG. 12, the receiving terminal device 2 first examines whether the image type (output attribute data) of the JPEG data is embedded in the JPEG data (step S1201). As shown in FIG. 8, the information about the image type is set in the application data segment having the marker code "0xFFEF" in the JPEG data, so the receiving terminal device 2 examines the segment regions 811 to 813. When the examination of step S1201 finds the "KIND" item in the region 812, then the receiving terminal device 2 takes out the value in the region 813 as the image type of the JPEG data (step S1202). When the "KIND" item is not set in the region 812, the receiving terminal device 2 decides that the image type of the JPEG data is not set in the JPEG data and further examines whether another file having the extension [.atr] and the same file name is present (step S1203). When the examination of step S1203 finds another file, the receiving terminal device 2 then obtains the JPEG data image type from the file and sets it (step S1204); when there is no separate file, it sets the image type as line drawing "2" as default (step S1205).

After setting the image type of the JPEG data, the receiving terminal device 2 decodes the JPEG data (step S1206). Subsequently, the receiving terminal device 2 refers to the set image type (step S1207). When the image type is "1" or a natural painting image, the receiving terminal device 2 applies dithering to the decoded image and displays it in the data display portion 26 (step S1208); otherwise it displays the decoded image as it is in the data display portion 26 (step S1209).

In this way, when the output attribute data about JPEG data is broadcast independently or is embedded in the JPEG data, the receiving terminal device 2 can receive the data and present an image display in accordance with the data type. Further, since the output attribute data described herein is set in a region to be arbitrarily referred to in the JPEG data (the application data segment), structures displaying JPEG other than that of this embodiment can display the images without problems.

The description has shown examples using the output attribute data which have been set in the data broadcasting device 1. However, this data broadcast system has the data analyzing portion 24 in the receiving terminal device 2. The receiving terminal device 2 is therefore capable of newly generating the output attribute data on the basis of multimedia data stored inside even if only the multimedia data is broadcast (when the output attribute data is not broadcast). The receiving terminal device 2 is also capable of changing the contents of the output attribute data broadcast from the data broadcasting device 1 as needed. Now an example of changing the setting about dithering to JPEG data will be described.

The methods for setting the output attribute data of JPEG data in the receiving terminal device 2 include a first method of changing the output attribute data embedded in JPEG data, a second method of changing the output attribute data set in a file separate from the JPEG data, and a third method of deleting the output attribute data embedded in the JPEG data.

The first method is now described referring to FIG. 13.

When displaying an image of JPEG data, the receiving terminal device 2 decides whether to apply dithering (step S1301). The decision of step S1301 is made on the basis of whether the display screen of the receiving terminal device 2 has resolution high enough to eliminate the need of dithering, whether the processing load of dithering should be removed, etc. When the step S1301 decides to apply dithering, the receiving terminal device 2 presumes the JPEG data to be a natural painting and sets "1" in the image type region in the application data segment having the marker code "0xFFEF" in the JPEG data (step S1302). On the other hand, when the step S1301 decides not to apply dithering, the receiving terminal device 2 presumes the JPEG data to be a line drawing and sets "2" in the image type region (step S1303).

The second method is realized by changing the data type in the output attribute data stored in another file to the image type presumed as above in the steps S1302 and S1303 of FIG. 13.

The third method can be realized by deleting the application data segment having the marker code "0xFFEF" in the JPEG data and then generating output attribute data containing the presumed image type in steps S1302 and S1303 of FIG. 13. When changing the setting not to apply dithering, it can be achieved just by deleting the application data segment (the original JPEG data is recovered).

As described above, JPEG images can be displayed with high visibility by setting the output attribute data of the JPEG images in the data broadcasting device 1 and referring to the data at the time they are displayed in the receiving terminal device 2. Further, the receiving terminal device 2 can change the output attribute data set in the JPEG images to store the JPEG data in the original format with the information added in the data broadcasting device 1 removed. The receiving terminal device 2 can also redistribute the JPEG data in the original format.

Next, another method for displaying JPEG data using their output attribute data is described.

Suppose that the receiving terminal device 2 is a mobile telephone. As is known, though recent mobile telephones have larger display screens, their area is limited not to deteriorate the portability as mobile telephones. Accordingly a user may connect the mobile telephone to a personal computer, car navigation, etc., (which are referred to as display devices hereinafter) to see the received data displayed in an enlarged form in their larger screen, instead of seeing it in a small screen of the mobile telephone.

However, data which the mobile telephones can receive are generally created to fit the standard display screen size of the mobile telephones. Hence, the following problems are encountered when data provided to be received and used in mobile telephones is displayed in a larger screen of a display device in an enlarged form:

1. When pixels of the display screen of the display device outnumber those in the received image, the received image is displayed in a small area in the display screen without being enlarged.

2. When the number of pixels of the display device is small, oblique lines, etc., in the received image are displayed in an enlarged form but as lines which are not smooth (i.e. with saw-like edges).

In order to solve the first problem, the received image may be enlarged by assigning one pixel in the image to a plurality of pixels in the display device. However this leads to the second problem. That is to say, the second problem occurs when data provided to be received and used in mobile telephones is displayed in an enlarged form in a large screen of a display device. When this problem occurs, a natural painting is displayed with gradation varying in rough grades, which will not look good. Further, oblique lines in a line drawing may have a saw-like appearance.

The receiving terminal device 2 hence performs the following processing.

Figure 14:
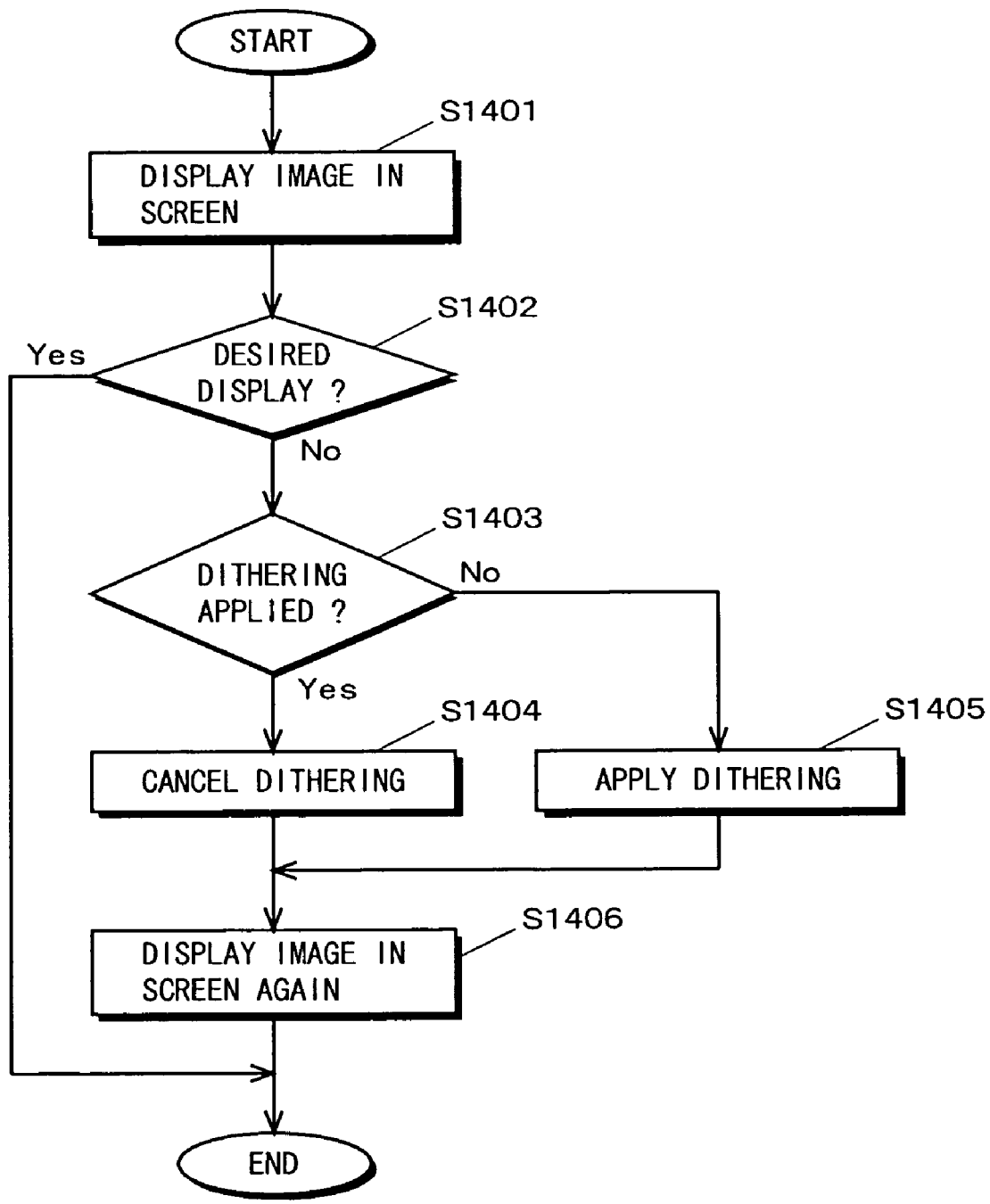
FIG. 14 is a flowchart showing an example of a process in which the receiving terminal device 2 displays JPEG data.

Referring to FIG. 14, the receiving terminal device 2 first displays the received image in the screen (step S1401). Whether to apply dithering to the image displayed in the screen in this step S1401 may be decided according to a default process previously defined in the receiving terminal device 2 or may be decided on the basis of the aforementioned output attribute data (which may be generated in either the data broadcasting device 1 or the receiving terminal device 2). Next a user judges whether the image is being desirably displayed in the screen (step S1402). Whether the display is desirable can be judged by the user on the basis of whether the gradation in a natural painting is harshly displayed to form stripes, whether lines in a line drawing may have a saw-like appearance, whether the whole image is unclear and illegible, etc. The user indicates the decision to the display device (e.g. the user enters the decision with a remote controller, etc.). When receiving an indication that the display is not preferred from the user, the receiving terminal device 2 examines whether the displayed image has undergone dithering (step S1403). When the image is dither-processed, the receiving terminal device 2 removes the dithering (step S1404); when the image is not dither-processed, it applies dithering to the image (step S1405). The receiving terminal device 2 then displays the image again (step S1406). Thus the user can see a preferably displayed image.

The receiving terminal device 2 may decide whether to apply dithering to the image on the basis of the display screen size of the display device.

Figure 15:
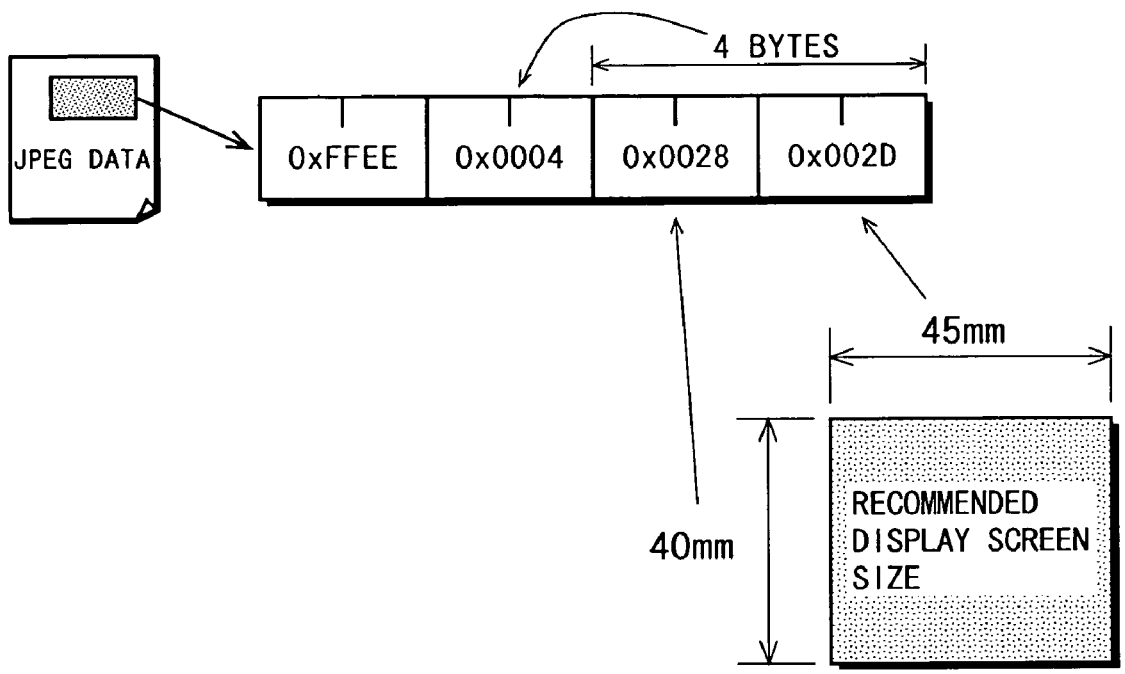
FIG. 15 is a diagram showing an example of the output attribute data embedded in JPEG data.

First, the data broadcasting device 1 generates output attribute data which gives a recommend display screen size capable of presenting preferable display without dithering. The output attribute data may be generated in a separate file from the JPEG data or embedded in the JPEG data as stated above. In the latter case, the data broadcasting device 1 defines the marker code of the segment for storing the output attribute data as "0xFFEE" as shown in FIG. 15, for example. The data broadcasting device 1 then stores the longitudinal size and lateral size of the recommended display screen size in the application segment region having the marker code "0xFFEE".

When receiving the output attribute data giving such a recommended display screen size, the receiving terminal device 2 operates as below.

Figure 16:
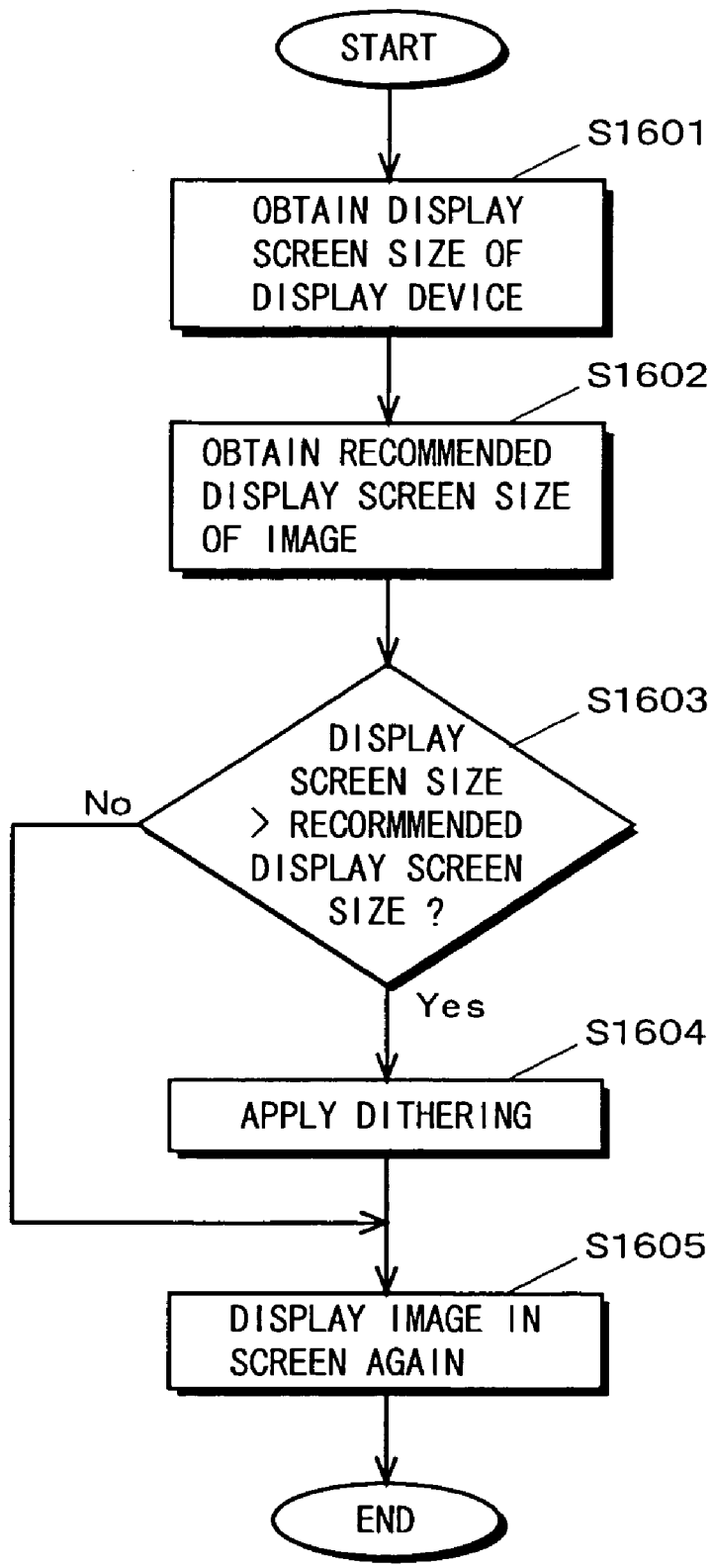
FIG. 16 is a flowchart showing an example of a process in which the receiving terminal device 2 displays JPEG data using the output attribute data.

Referring to FIG. 16, the receiving terminal device 2 first obtains the display screen size of the display device (step S1601). The receiving terminal device 2 can obtain the display screen size from the display device through its own interface. Next, the receiving terminal device 2 analyzes the output attribute data about the received image and obtains the recommended display image size (step S1602). The receiving terminal device 2 then compares the display screen size of the display device and the recommended display screen size (step S1603). When the display screen size of the display device is larger than the recommended display screen size in step S1603, the receiving terminal device 2 applies dithering to the received image (step S1604) and displays it in the screen (step S1605). On the other hand, when the display screen size of the display device is smaller than the recommended display screen size in step S1603, the receiving terminal device 2 displays the received image as it is in the screen without applying dithering (step S1605). The steps S1402 to 1406 of FIG. 14 may be performed after the image is displayed in the screen in the step S1605 so that the user can select the image display.

While the dithering is particularly effective when an image is seen in a large screen, it may be effective also when an image is seen in a small screen on a mobile telephone, etc. Usually, to display a larger number of characters within a screen of limited size, a reduced number of pixels are used per character. However, in mobile telephones, the number of pixels per character is fixed in text display. Now, if character information is displayed not in text display but in graphic display as of JPEG image, a larger number of characters can be displayed using smaller characters. However, if the characters are too small, they are ruined in shape and become illegible. When dithering is applied to such small characters, their outlines can be vaguely displayed, which may allow the user to figure out the characters more easily.

As described so far, according to the data broadcast system of the embodiment of the invention, the receiving terminal device 2 receives multimedia data and output attribute data broadcast from the data broadcasting device 1, and stores, manages and displays the data. It also processes the multimedia data to generate the output attribute data from the multimedia data, to embed the output attribute data into the multimedia data, etc.

In the case of a system where the receiving terminal device 2 further distributes multimedia data to another receiving terminal device (when the receiving terminal device 2 has a function as a relay center, for example), the data analyzing portion 24 in the receiving terminal device 2 may be provided with the function to generate the output attribute data. In this case, the data broadcasting device 1 is not necessarily required to generate the output attribute data; it can broadcast only the multimedia data.

For the method of providing from the transmitting side to the receiving side the display attribute about JPEG data, i.e. the information as to whether to apply dithering on the basis of whether it is a natural painting or line drawing, the method can be applied not only to the data broadcasts described in this embodiment but also to various common data communications. This method is especially effective for receiving terminal devices with lower performance.

While the invention has been described in detail, the foregoing description is in all aspects illustrative and not restrictive. It is understood that numerous other modifications and variations can be devised without departing from the scope of the invention.

What is claimed is:

1. A broadcast data receiving device for receiving and outputting broadcast data, broadcast on a designated channel, including a plurality of multimedia data and attribute information, said broadcast data receiving device comprising:

a receiving unit operable to sequentially receive the plurality of multimedia data and the attribute information, the plurality of multimedia data and the attribute information being included independently of each other in the broadcast data, the attribute information including a table of information respectively corresponding to the plurality of multimedia data, and the table of information including information indicating a data type of the plurality of received multimedia data;

a storing unit operable to store the plurality of received multimedia data and the attribute information;

an outputting unit operable to output the plurality of stored multimedia data; and a managing unit operable to create management information for collectively managing the plurality of stored multimedia data and the attribute information, to manage the plurality of stored multimedia data with reference to the attribute information associated with the management information, the plurality of stored multimedia data and the attribute information being kept under management in association with each other, to refer to the data type included in the attribute information associated with the management information, and to change a process, performed by the outputting unit, for outputting the plurality of stored multimedia data according to the data type, wherein the attribute information includes an identification code, a storage location, a number of links to other multimedia data, an image number, and a data size of each received multimedia data in association with each other in the table of information respectively corresponding to the plurality of received multimedia data, the identification code of each multimedia data respectively specifies each multimedia data present in the plurality of received multimedia data, the storage location of each multimedia data is recorded as a uniform resource locator;

the number of links to the multimedia data specifies data which is linked to other multimedia data present in the plurality of received multimedia data, and the image number of each multimedia data specifies a number of sheets of images included in the multimedia data.

2. The broadcast data receiving device according to claim 1, wherein the data type includes at least an HTML format.

3. The broadcast data receiving device according to claim 1, wherein the attribute information includes start-up information of the plurality of received multimedia data.

4. A broadcast data receiving method for receiving and outputting broadcast data, broadcast on a designated channel, including a plurality of multimedia data and attribute information, said broadcast data receiving method comprising:

sequentially receiving the plurality of multimedia data and the attribute information, the plurality of multimedia data and the attribute information being included independently of each other in the broadcast data, the attribute information including a table of information respectively corresponding to the plurality of multimedia data, and the table of information including information indicating a data type of the plurality of received multimedia data;

storing the plurality of received multimedia data and the attribute information;

outputting the plurality of stored multimedia data;

creating management information for collectively managing the plurality of stored multimedia data and the attribute information, the plurality of stored multimedia data and the attribute information being kept under management in association with each other;

managing the plurality of stored multimedia data with reference to the attribute information associated with the management information;

referring to the data type included in the attribute information associated with the management information; and changing a display process for outputting the plurality of stored multimedia data according to the data type, wherein the attribute information includes an identification code, a storage location, a number of links to other multimedia data, an image number, and a data size of each received multimedia data in association with each other in the table of information respectively corresponding to the plurality of received multimedia data, the identification code of each multimedia data respectively specifies each multimedia data present in the plurality of received multimedia data, the storage location of each multimedia data is recorded as a uniform resource locator;

the number of links to the multimedia data specifies data which is linked to other multimedia data present in the plurality of received multimedia data, and the image number of each multimedia data specifies a number of sheets of images included in the multimedia data.

* * * * *